(12) United States Patent
Ahn et al.

(10) Patent No.: US 8,259,113 B2
(45) Date of Patent: Sep. 4, 2012

(54) METHOD, APPARATUS, AND MEDIUM FOR TRANSFORMING GRAPHIC DATA OF AN OBJECT

(75) Inventors: Jeonghwan Ahn, Suwon-si (KR);
Dokyoon Kim, Seongnam-si (KR);
Keechang Lee, Yongin-si (KR);
Sangoak Woo, Anyang-si (KR); Nikolay Yurievich Gerasimov, Saint-Petersburg (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/805,274

(22) Filed: Jul. 21, 2010

(65) Prior Publication Data
US 2010/0289823 A1    Nov. 18, 2010

Related U.S. Application Data

(63) Continuation of application No. 11/345,345, filed on Feb. 2, 2006.

(30) Foreign Application Priority Data

Feb. 3, 2005  (KR) ............. 10-2005-0010177
Jun. 21, 2005  (KR) ............. 10-2005-0053552

(51) Int. Cl.
*G06T 17/00* (2006.01)
*G06T 15/00* (2011.01)
*G06T 17/20* (2006.01)
(52) U.S. Cl. ............. 345/428; 345/423; 345/419
(58) Field of Classification Search ........... 345/419, 345/423, 428
See application file for complete search history.

(56) References Cited

U.S. PATENT DOCUMENTS

| | | | | |
|---|---|---|---|---|
| 5,675,721 A | 10/1997 | Freedman et al. | ............ | 345/502 |
| 5,689,577 A | 11/1997 | Arata | ............ | 382/128 |
| 5,886,702 A | 3/1999 | Migdal et al. | ............ | 345/423 |
| 5,896,139 A | 4/1999 | Strauss | ............ | 345/440 |
| 5,929,860 A | 7/1999 | Hoppe | | |
| 5,963,209 A | 10/1999 | Hoppe | | |

(Continued)

FOREIGN PATENT DOCUMENTS

JP              9-231401              9/1997

(Continued)

OTHER PUBLICATIONS

Gieng et al., "Constructing Hierarchies for Triangle Meshes" IEEE Transactions on Visualization and Computer Graphics, IEEE Service Center, Los Alamitos, CA, US, vol. 4, No. 2, Apr.-Jun. 1998, pp. 145-161.*

(Continued)

*Primary Examiner* — Daniel Hajnik
*Assistant Examiner* — Roberta D Prendergast
(74) *Attorney, Agent, or Firm* — Staas & Halsey LLP

(57) ABSTRACT

A method, apparatus, and medium for transforming a graphic data of an object and a computer readable recording medium storing a program for executing the method are provided. The method includes; determining at least one triangle to be collapsed among one or more triangles comprised in the object, determining a collapsing vertex to be created by collapsing the at least one triangle, and transforming the graphic data of the object based on information regarding the at least one triangle determined to be collapsed and information regarding the determined collapsing vertex. Thus, a large three-dimensional object can be efficiently rendered with a small amount of resources.

44 Claims, 24 Drawing Sheets

U.S. PATENT DOCUMENTS

| | | | |
|---|---|---|---|
| 5,966,133 A | 10/1999 | Hoppe | |
| 5,966,140 A | 10/1999 | Popovic et al. | |
| 5,977,988 A | 11/1999 | Greene | 345/443 |
| 6,031,548 A | 2/2000 | Gueziec et al. | 345/440 |
| 6,046,744 A | 4/2000 | Hoppe | |
| 6,075,540 A | 6/2000 | Hoppe | |
| 6,108,006 A | 8/2000 | Hoppe | |
| 6,137,492 A | 10/2000 | Hoppe | |
| 6,154,215 A | 11/2000 | Hopcroft et al. | 345/418 |
| 6,262,737 B1 | 7/2001 | Li et al. | 345/419 |
| 6,262,739 B1 | 7/2001 | Migdal et al. | 345/423 |
| 6,266,053 B1 | 7/2001 | French et al. | 715/255 |
| 6,310,619 B1 | 10/2001 | Rice | 345/420 |
| 6,362,820 B1 | 3/2002 | Hoppe | |
| 6,414,683 B1 | 7/2002 | Gueziec | 345/428 |
| 6,421,051 B1 * | 7/2002 | Kato | 345/428 |
| 6,426,747 B1 | 7/2002 | Hoppe et al. | |
| 6,426,750 B1 | 7/2002 | Hoppe | |
| 6,538,652 B2 | 3/2003 | Kato | 345/428 |
| 6,587,104 B1 | 7/2003 | Hoppe | |
| 6,668,091 B1 | 12/2003 | Kim et al. | 382/243 |
| 6,798,411 B1 | 9/2004 | Gorman et al. | 345/428 |
| 6,853,373 B2 | 2/2005 | Williams et al. | 345/419 |
| 7,027,050 B1 | 4/2006 | Dunnett et al. | 345/440 |
| 7,209,138 B2 | 4/2007 | Gorman et al. | 345/423 |
| 2002/0030677 A1 | 3/2002 | Huang et al. | 345/420 |
| 2002/0075263 A1 | 6/2002 | Kato | 345/423 |
| 2003/0206165 A1 | 11/2003 | Hoppe et al. | |
| 2003/0206177 A1 | 11/2003 | Hoppe et al. | |
| 2003/0206178 A1 | 11/2003 | Hoppe et al. | |
| 2004/0075655 A1 | 4/2004 | Dunnett | 345/418 |

FOREIGN PATENT DOCUMENTS

| | | |
|---|---|---|
| JP | 11-339061 | 12/1999 |
| JP | 2000-242807 | 9/2000 |
| JP | 2003-281568 | 10/2003 |
| KR | 10-2005-0013287 A | 2/2005 |

OTHER PUBLICATIONS

Garland, et al., "Simplifying surfaces with color and texture using quadric error metrics", Proceedings of the Conference on Visualization '98, Research Triangle Park, North Carolina, Oct. 18-23, 1998, IEEE Visualization, IEEE Computer Society Press, Los Alamitos, CA, pp. 263-269, 542.*

Cignoni et al., "A general method for preserving attribute values on simplified meshes", Proceedings of the conference on Visualization '98, p. 59-66, Oct. 18-23, 1998, Research Triangle Park, North Carolina, United States, IEEE Computer Society Press.*

Brutzman, D., 1998., "The virtual reality modeling language and Java", Commun. ACM, vol. 41, Issue 6, Jun. 1998, pp. 57-64.*

Garland, M., 1999, "Quadric-Based Polygonal Surface Simplification", Doctoral Thesis, Carnegie Mellon University, Jan. 1999, 210 pages.*

S. C. Cheng and W. M. Lai, "A Region-Growing Approach to 3D Model Segmentation Using Relaxation Labeling", 16th IPPR Conference on Computer Vision, Graphics and Image Processing (CVGIP 2003), Aug. 17-19, 2003, pp. 702-709.*

U.S. Notice of Allowance for U.S. Appl. No. 11/345,345; mailed Jul. 22, 2010.

Japanese Office Action for corresponding Japanese Patent Application No. 2006-027697 dated Feb. 22, 2011 (4 pgs).

Brutzman, D., 1998, "The Virtual Reality Modeling Language and Java", Commun. ACM, vol. 41, Issue 6, Jun. 1998, pp. 57-64.

Garland, et al., "Simplifying Surfaces with Color and Texture Using Quadric Error Metrics", Proceedings of the Conference on Visualization '98, Research Triangle Park, North Carolina, Oct. 18-23, 1998, IEEE Visualization, IEEE Computer Society Press, Los Alamitos, CA, pp. 263-269.

Chen, B. and Nishita, T., "Multiresolution Streaming Mesh with Shape Preserving and QoS-like Controlling", Proceedings of the Seventh International Conference on 3D Web Technology, Feb. 24-28, 2002, Web3D'02, ACM, New York, NY, pp. 35-42.

T.S. Gieng, et al., "Smooth Hierarchical Surface Triangulations," Visualization '97, R. Yagel and H. Hagen, eds., Los Alamitos, Calif., IEEE CS Press, pp. 379-386, 1997.

Hong, W. and Kaufman, A., 2003, "Feature Preserved Volume Simplification", Proceedings of the Eighth ACM Symposium on Solid Modeling and Applications, Jun. 16-20, 2003, SM '03. ACM, New York, NY, pp. 334-339.

Hoppe, H., 1996, "Progressive Meshes", Proceedings of the 23$^{rd}$ Annual Conference on Computer Graphics and Interactive Techniques, SIGGRAPH '96, ACM, New York, NY, pp. 99-108.

Hoppe, H. "Smooth View-Dependent Level-of-Detail Control and its Application to Terrain Rendering", Proceedings of the Conference on Visualization '98, Research Triangle Park, North Carolina, Oct. 18-23, 1998, IEEE Visualization, IEEE Computer Society Press, Los Alamitos, CA, pp. 35-42.

P. Lindstrom and G. Turk, "Fast and Memory Efficient Polygonal Simplification," Proc. Visualization '98, pp. 279-286, Oct. 1998.

Peter Linstrom, Cláudio T. Silva, "A Memory Insensitive Technique for Large Model Simplification", Proceedings of the Conference on Visualization '01, Oct. 21-26, 2001, San Diego, California, pp. 121-127.

Popović, J. and Hoppe, H., 1997, "Progressive Simplicial Complexes", Proceedings of the 24$^{th}$ Annual International Conference on Computer Graphics and Interactive Techniques, ACM Press/Addison-Wesley Publishing Co., New York, NY, pp. 217-224.

Sander, P. V., Snyder, J., Gortler, S. J., and Hoppe, H., 2001, "Texture Mapping Progressive Meshes", Proceedings of the 28$^{th}$ Annual Conference on Computer Graphics and Interactive Techniques, SIGGRAPH '01, ACM, New York, NY, pp. 409-416.

Schroeder, et al., 1992, "Decimation of Triangle Meshes", Proceedings of the 19$^{th}$ Annual Conference on Computer Graphics and Interactive Techniques, J.J. Thomas, Ed., SIGGRAPH '92, ACM, New York, NY, pp. 65-70.

Takeuchi, et al., "Subdivision Surface Fitting with QEM-based Mesh Simplification and Reconstruction of Approximated B-spline Surfaces", Proceedings of the Eighth Pacific Conference on Computer Graphics and Applications, pp. 202-212, 2000.

Taubin, G. and Rossignac, J. 1998. "Geometric Compression Though Topological Surgery", ACM Trans. Graph. 17, 2 (Apr. 1998), pp. 84-115.

Taubin, G.; Horn, W.P.; Lazarus, F.; Rossignac, J.; "Geometry Coding and VRML", Proceedings of the IEEE, vol. 86, Issue 6, Jun. 1998, pp. 1228-1243.

Trotts, I. J., Hamann, B., and Joy, K. I., 1999, "Simplification of Tetrahedral Meshes with Error Bounds", IEEE Transactions on Visualization and Computer Graphics 5, 3 (Jul. 1999), pp. 224-237.

Onyx2™ Deskside Workstation Owner's Guide, Document No. 007-3454-005, http://techpubs.sgi.com/library/manuals/3000/007-3454-005/pdf/007-3454-005.pdf., © 1997-1999.

Gieng et al., "Constructing Hierarchies for Triangle Meshes" IEEE Transactions on Visualization and Computer Graphics, IEEE Service Center, Los Alamitos, CA, US, vol. 4, No. 2, Apr.-Jun. 1998, pp. 145-161, XP000765491, ISN:1077-2626.

Cognoni et al., Association for Computing Machinery Institute of Electrical and Electronics Engineers: "General Method for Preserving Attribute Values on Simplified Meshes" Proceedings Visualization '98. VIS '98. Research Triangle Park, NC, Oct. 18-23, 1998, Annual IEEE Conference on Visualization, New York, NY: IEEE, US, Vol. Conf. 9, Oct. 18, 1998, pp. 59-66, XP000887533 ISBN:0-8186-9178-6.

Ulucay et al., "3-Dimensional Object Modeling with Mesh Simplification Based Resolution Adjustment", 3D Data Processing, Visualization and Transmission, 2004. 3DPVT 2004, Proceedings, 2$^{nd}$ International Symposium on Thessaloniki, Greece Sep. 6-9, 2004, Piscataway, NJ, USA, IEEE, Sep. 6, 2004, pp. 132-138, XP010725093, ISBN: 0-7695-2223-8.

Hoppe, Ebert et al. Institute of Electrical and Electronics Engineers: "New Quadric Metric for Simplifying Meshes with Appearance Attributes" Proceedings Visualization '99. VIS '99. San Francisco, CA, Oct. 24-29, 1999, Annual IEEE Conference on Visualization Los Almitos, CA: IEEE Comp. Soc, US Oct. 24, 1999, pp. 59-66 XP000895683, ISBN:0-7803-5899-6.

Soucy et al., "A Texture-Mapping Approach for the Compression of Colored 3D Triangulations", Visual Computer, Springer, Berlin, DE., vol. 12, No. 10, 1996, pp. 503-514, XP000196929, ISSN: 0178-2789.

Trotts et al., "Simplification of Tetrahedral Meshes" Visualization '98. Proceedings Research Triangle Park, NC, USA Oct. 18-23, 1998, Piscataway, NH USA, IEEE, US Oct. 18, 1998, pp. 287-295, XP010321031, ISBN: 0-8186-9176-X.

S. C. Cheng and W. M. Lai, "A Region-Growing Approach to 3D Model Segmentation Using Relaxation Labeling", 16th IPPR Conference on Computer Vision, Graphics and Image Processing (CVGIP 2003), Aug. 17-19, 2003, pp. 702-709.

J. Cohen, D. Manocha and M. Olano, "Simplifying Polygonal Models Using Successive Mappings," Proc. Visualization '97, pp. 395-402, Oct. 1997.

U.S. Appl. No. 11/345,345, filed Feb. 2, 2006, Ahn, Jeonghwon et al., Samsung Electronics Co., Ltd.

European Search Report Issued on May 26, 2006 in European Patent Application 06250560.7-2218.

U.S. Office Action mailed Oct. 2, 2008 in U.S. Appl. No. 11/345,345.

U.S. Final Office Action mailed Apr. 22, 2009 in U.S. Appl. No. 11/345,345.

U.S. Advisory Action mailed Jul. 10, 2009 in U.S. Appl. No. 11/345,345.

U.S. Office Action mailed Sep. 21, 2009 in U.S. Appl. No. 11/345,345.

U.S. Final Office Action mailed Apr. 1, 2010 in U.S. Appl. No. 11/345,345.

U.S. Advisory Action mailed Jun. 10, 2010 in U.S. Appl. No. 11/345,345.

Research on Generating Technique of Special Effects and Surface Simplification Technique of Object Models in Virtual Battlefield, Linxu Wang, Graduate School of National University of Defense Technology, China Doctor Dissertation Full-text Database, Dec. 31, 2002.

Research on Object's Positioning in Virtual Scene and LOD (level of detail) Modeling, Fuqiang ZUO, Nanjing University of Science and Technology, China Master Dissertation Full-text Database, Dec. 31, 2003.

A Mesh Simplification Algorithm Based on Triangle Collapse, Kun ZHOU, etc. Chinese Journal of Computer, Jun. 30, 1998.

Chinese Office Action issued Dec. 5, 2008 in corresponding Chinese Patent Application 2006100033119.

* cited by examiner

LEVEL k-1                                    LEVEL k

Geo-Morphing

FIG. 21

- field MFInt32 lodSequence       [ ]
- field SFInt32 coordStart        0        [0, ∞]
- field SFInt32 texCoordStart     0        [0, ∞]
- field SFInt32 normalStart       0        [0, ∞]
- field SFInt32 colorStart        0        [0, ∞]
- field SFFloat updateDist        0.0      [0, ∞]
- field SFFloat minScreenArea     0.08     [0, ∞]

FIG. 22

$$[\, n_1,\, -1,\, n_2,\, -1,\, \ldots,\, n_N \,]$$

LOD=1   LOD=2        LOD=N

```
        2611                          2612 coord  [ x0  y0  z0,        coordIndex  [ 2, 1, 7, -1,
          x1, y1, z1,                      6, 7, 0, -1,
          x2, y2, z3,                      0, 1, 5, -1,
          x3, y3, z3,                      0, 4, 2, -1,
          x4, y4, z4,                      6, 2, 7, -1,
          x5, y5, z5,                      2, 3, 1, -1,
          x6, y6, z6,                      0, 7, 1, -1,
          x7, y7, z7 ]                     0, 5, 4, -1,
                                           1, 3, 5, -1,
                                           2, 4, 3, -1,
 ORIGINAL VRML MODEL                       4, 5, 3, -1,
       (2610)                              6, 0, 2, -1]
```

METHOD, APPARATUS, AND MEDIUM FOR TRANSFORMING GRAPHIC DATA OF AN OBJECT

CROSS-REFERENCE TO RELATED APPLICATIONS

This application is a continuation of application Ser. No. 11/345,345 filed on Feb. 2, 2006, which claims the priority of Korean Patent Applications No. 10-2005-0010177, filed on Feb. 3, 2005 and Application No. 10-2005-0053552, filed Jun. 21, 2005, in the Korean Intellectual Property Office, the disclosure of which is incorporated herein by reference.

BACKGROUND OF THE INVENTION

1. Field of the Invention

The present invention relates to a method, apparatus, and medium for transforming a graphic data of an object and a computer readable recording medium storing a program for executing the method.

2. Description of the Related Art

FIGS. 1A through 1C are diagrams for explaining a level of detail (LOD) of an object. There conical shapes are shown in FIG. 1A. The leftmost conical shape is not substantially a cone rather, it approximates a pyramid shape having 4 planes. The center conical shape has 8 planes and the rightmost conical shape has 16 planes. The three conical shapes shown in FIG. 1A are different from one another according to a direction in which light is reflected from each of the three conical shapes.

FIG. 1B illustrates the three conical shapes of FIG. 1 viewed from a farther distance. The leftmost conical shape can be distinguished from the rightmost conical shape and the center conical shape. However, it is difficult to clearly identify a difference between the rightmost conical shape and the center conical shape.

FIG. 1C illustrates the three conical shapes of FIG. 1 viewed from a much farther distance. In this case is almost impossible to identify a difference among the three conical shapes.

Such image sequences prove that it is more difficult to identify the details of an object as the distance between the object and a viewer increases. This indicates that not all details of the object need to be drawn when the object is seen from a large distance. When the shape of an object becomes more complicated, more tasks are needed to draw the object. Thus, it is not necessary to draw in detail the object when a viewer is far away from it.

Three-dimensional data is too large to be effectively rendered with limited resources. Accordingly, progressive rendering, which takes a user's placement into consideration, is desired.

SUMMARY OF THE INVENTION

Additional aspects, features, and/or advantages of the invention will be set forth in part in the description which follows and, in part, will be apparent from the description, or may be learned by practice of the invention.

The present invention provides a method and apparatus for transforming a graphic data of an object, by which a three-dimensional object is effectively rendered with limited resources, and a computer readable recording medium storing a program for executing the method.

According to an aspect of the present invention, there is provided a method of transforming a graphic data of an object comprising at least one triangle. The method includes determining at least one triangle to be collapsed among the at least one triangle comprised in the object, determining a collapsing vertex to be created by collapsing the at least one triangle, and transforming the graphic data of the object based on information regarding the at least one triangle determined to be collapsed and information regarding the determined collapsing vertex.

The determining of the at least one triangle to be collapsed may include determining an parameter that has the least influence on object rendering when a triangle comprised in the object is removed, and determining the at least one triangle to be collapsed based on the parameter.

The determining of the collapsing vertex may include calculating the collapsing vertex based on three vertices of the at least one triangle to be collapsed and a tangent plane of the three vertices. In addition, the determining of the collapsing vertex may include calculating attribute information of the collapsing vertex based on three vertices of the at least one triangle to be collapsed.

According to another aspect of the present invention, there is provided a method of adaptively transforming a graphic data of an object. The method may include receiving a graphic model including information regarding vertices of the object and information regarding at least one triangle comprised in the object to express the object including one or more triangles, determining at least one triangle to be collapsing among the triangles comprised in the object and determining a collapsing vertex to be created by collapse of the at least one triangle, creating a graphic model including information regarding the at least one triangle determined to be collapsed and information regarding the determined collapsing vertex, transforming the graphic data of the object based on the created graphic model, and rendering the object.

The determining of the at least one triangle and the collapsing vertex may include defining an error metric serving as an indicator indicating a degree of influence that each triangle comprised in the object has on object rendering, calculating error values with respect to each triangle comprised in the object based on the error metric, and determining at least one triangle to be collapsed and a triangle collapse sequence based on the calculated error values.

According to still another aspect of the present invention, there is provided a method of adaptively transforming a graphic data of an object including one or more triangles. The method includes defining an error metric serving as an indicator that indicates a degree of influence that each triangle comprised in the object has on object rendering, calculating error values with respect to triangle comprised in the object based on the error metric, and collapsing first a triangle having a least error value among the calculated error values.

The defining of the error metric may include defining the error metric as a sum of an error regarding geometric characteristics of each triangle and an error regarding attribute characteristics of the triangle.

The error regarding geometric characteristics of each triangle may be determined based on at least one of a radius of curvature of the triangle, an area of the triangle in an entire mesh, and whether the triangle is located at a border. The error regarding attribute characteristics of the triangle may be determined based on at least one of a variation of color between the triangle and neighboring triangles, a variation of a texture coordinate value therebetween, and a variation of a normal line therebetween.

The collapsing of the triangle may include creating a collapsing vertex to replace the triangle, changing a connection relationship between the triangles comprised in the object based on the collapsing vertex, and creating a new graphic data of the object based on the changed connection relationship.

According to yet another aspect of the present invention, there is provided a method of collapsing a triangle into a vertex in an object expressed as a graphic data including one or more triangles. The method includes defining normal lines on a surface of a mesh for each of three vertices of a triangle to be collapsed; defining a tangent plane for each vertex of the triangle, the tangent plane including the vertex and being perpendicular to a normal line corresponding to the vertex; projecting a central point of the three vertices of the triangle onto three tangent planes defined each of for the three vertices, thereby obtaining three projection points; and obtaining a collapsing vertex by calculating a mean of the three projection points.

According to a further aspect of the present invention, there is provided a method of creating a graphic model used to adaptively transform a graphic data of an object including a plurality of triangles. The method includes; determining triangles to be collapsed in the object, a triangle collapse sequence, and a collapsing vertex to be created by collapsing the triangles; generating a triangle identifier node in which information regarding the triangles comprised in the object are arranged in the triangle collapse sequence; generating a level of detail (LOD) sequence node including triangle collapse sequence information; generating a coordinate node in which coordinate information of vertices of the object and coordinate information of the collapsing vertex are arranged; and generating a collapsing vertex position node that refers to a position of the coordinate information of the collapsing vertex located in the coordinate node.

The determining may include calculating error values with respect to each of the triangles comprised in the object based on an error metric corresponding to an parameter that indicates a degree of influence that each triangle comprised in the object has on object rendering, and determining the triangle collapse sequence so that a triangle having a smaller error value is collapsed earlier.

The method may further include; generating an update node including information for collapsing the triangles gradually between collapsing levels; and generating a node including information regarding a level where the collapse of the triangles is started in the object.

The method may further include at least one of; generating a color node in which color information of the vertices comprised in the object and color information of the collapsing vertex are arranged and generating a collapsing vertex color node that refers to a position of the color information of the collapsing vertex arranged in the color node; generating a normal node in which normal information of the vertices of the object and normal information of the collapsing vertex are arranged and generating a collapsing vertex normal node that refers to a position of the normal information of the collapsing vertex arranged in the normal node; and generating a texture coordinate node in which texture coordinate information of the vertices of the object and texture coordinate information of the collapsing vertex are arranged and generating a collapsing vertex texture coordinate node that refers to a position of the texture coordinate information of the collapsing vertex arranged in the texture coordinate node.

According to another aspect of the present invention, there is provided a method of creating a virtual reality modeling language (VRML) model used to adaptively transforming a graphic data of an object including one or more triangles. The method includes; determining triangles to be collapsed in the object, a triangle collapse sequence, and a collapsing vertex to be created by collapsing the triangles; generating a coordIndex node in which information regarding the triangles comprised in the object are arranged in the triangle collapse sequence; generating a lodSequence node including triangle collapse sequence information; generating a coord node in which coordinate information of vertices of the object and coordinate information of the collapsing vertex are arranged; and generating a coordStart node that refers to a position of the coordinate information of the collapsing vertex arranged in the coord node.

The method may further include one of; generating a normalIndex node in which information regarding each of the triangles comprised in the object are arranged in the collapsing triangle sequence, generating a normal node in which normal information of the vertices of the object and normal line information of the collapsing vertex are arranged, and generating a normalStart node that refers to a position of the normal information of the collapsing vertex arranged in the normal node; generating a colorIndex node in which information regarding the respective triangles comprised in the object are arranged in the collapsing triangle sequence, generating a color node in which color information of the vertices of the object and color information of the collapsing vertex are arranged, and generating a colorStart node that refers to a position of the color information of the collapsing vertex arranged in the color node; and generating a texcoordIndex node in which information regarding each of the triangles comprised in the object are arranged in the collapsing triangle sequence, a texture coordinate node in which texture coordinate information of the vertices of the object and the texture coordinate information of the collapsing vertex are arranged, and generating a texcoordStart node that refers to a position of the texture coordinate information of the collapsing vertex arranged in the texture coordinate node.

According to still another aspect of the present invention, there is provided an apparatus for transforming a graphic data of an object including one or more triangle. The apparatus includes: a pre-processing unit determining at least one triangle to be collapsed among the triangles comprised in the object and determining a collapsing vertex to be created by collapsing the triangle, and a rendering unit transforming the graphic data of the object based on information regarding the triangle determined by the pre-processing unit to be collapsed and information regarding the determined collapsing vertex and performing object rendering.

According to yet another aspect of the present invention, there is provided an apparatus for adaptively transforming a graphic data of an object. The apparatus includes: a pre-processing unit receiving a graphic model including information regarding vertices of the object and information regarding at least one triangle comprised in the object to express the object including the at least one triangle, determining the at least one triangle to be collapsed among the triangles comprised in the object, determining a collapsing vertex to be created by collapsing the at least one triangle, and creating a graphic model including information regarding the at least one triangle determined to be collapsed and information regarding the determined collapsing vertex; and a rendering unit transforming the graphic data of the object based on the created graphic model and rendering the object.

According to a further aspect of the present invention, there is provided an apparatus for adaptively transforming a graphic data of an object including one or more triangles. The apparatus includes; a pre-processing unit that defines an error metric serving as an parameter indicating a degree of influence that each triangle comprised in the object has on object rendering and calculating error values with respect to each of the triangles comprised in the object based on the error metric; and a rendering unit collapsing first a triangle having a least error value among the calculated error values and rendering the object.

According to another aspect of the present invention, there is provided an apparatus for creating a graphic model used to adaptively transforming a graphic data of an object including one or more triangles. The apparatus includes; an error value calculator determining triangles to be collapsed in the object and a triangle collapse sequence based on at least one of a degree of influence that each triangle comprised in the object has on object rendering; a collapsing vertex calculator determining a collapsing vertex to be created by collapsing the triangles; and a graphic model creator generating a triangle identifier node in which information regarding the triangles comprised in the object are arranged in the triangle collapse sequence, a LOD sequence node including triangle collapse sequence information, a coordinate node in which coordinate information of vertices comprised in the object and coordinate information of the collapsing vertex are arranged, and a collapsing vertex position node that refers to a position of the coordinate information of the collapsing vertex located in the coordinate node.

According to still another aspect of the present invention, there is provided an apparatus for creating a VRML model used to adaptively transforming a graphic data of an object including a plurality of triangles. The apparatus includes; an error value calculator determining triangles to be collapsed in the object and a triangle collapse sequence based on at least one of a degree of influence that each triangle comprised in the object has on object rendering; a collapsing vertex calculator determining a collapsing vertex to be created by collapse of the triangles; and a graphic model creator generates a coordIndex node, in which information regarding the triangles comprised in the object are arranged in the triangle collapse sequence, a lodSequence node including triangle collapse sequence information, a coord node, in which coordinate information of vertices comprised in the object and coordinate information of the collapsing vertex are arranged, and a coordStart node that refers to a position of the coordinate information of the collapsing vertex arranged in the coord node.

According to yet another aspect of the present invention, there is provided at least one computer readable medium storing instructions that control at least one processor for executing a method of transforming a graphic data of an object at least one triangle, the method including determining at least one triangle to be collapsed among the at least one triangle comprised in the object; determining a collapsing vertex to be created by collapse of the triangle; and transforming the graphic data of the object based on information regarding the at least one triangle determined to be collapsed and information regarding the determined collapsing vertex.

According to a further aspect of the present invention, there is provided at least one computer readable medium storing instructions that control at least one processor for executing a method of adaptively transforming a graphic data of an object, the method including receiving a graphic model that includes information regarding vertices comprised in the object and information regarding at least one triangle comprised in the object to express the object comprised of the at least one triangle; determining at least one triangle to be collapsed among the triangles comprised in the object and determining a collapsing vertex to be created by collapse of the triangle; creating a graphic model including information regarding the triangle determined to be collapsed and information regarding the determined collapsing vertex; and transforming the graphic data of the object based on the created graphic model and rendering the object.

According to another aspect of the present invention, there is provided at least one computer readable medium storing instructions that control at least one processor for executing a method of adaptively transforming a graphic data of an object comprised of at least one triangle, the method including defining an error metric serving as an indicator that indicates a degree of influence that each triangle comprised in the object exerts on an expression of the object; calculating error values with respect to respective triangles comprised in the object based on the error metric; and collapsing first a triangle having a least error value among the calculated error values.

According to still another aspect of the present invention, there is provided at least one computer readable medium storing instructions that control at least one processor for executing a method of collapsing a triangle into a vertex in an object expressed as a graphic data comprised of one or more triangles, the method including defining normal lines on a surface of a mesh for respective three vertices of a triangle to be collapsed; defining a tangent plane for each vertex of the triangle, the tangent plane including the vertex and being perpendicular to a normal corresponding to the vertex; projecting a central point of the three vertices of the triangle onto three tangent planes defined for the respective three vertices, thereby obtaining three projected points; and obtaining a collapsing vertex by calculating a mean of the three projected points.

According to yet another aspect of the present invention, there is provided at least one computer readable medium storing instructions that control at least one processor for executing a method of creating a graphic model used to adaptively transforming a graphic data of an object comprised of one or more triangles, the method including determining at least one triangle to be collapsed in the object, a triangle collapse sequence, and a collapsing vertex to be created by collapse of the at least one triangle; generating a triangle identifier node in which information regarding the triangles comprised in the object are arranged in the triangle collapse sequence; generating a LOD sequence node including triangle collapse sequence information; generating a coordinate node in which coordinate information of vertices comprised in the object and coordinate information of the collapsing vertex are arranged; and generating a collapsing vertex position node that refers to a position of the coordinate information of the collapsing vertex located in the coordinate node.

According to a further aspect of the present invention, there is provided at least one computer readable medium storing instructions that control at least one processor for executing a method of creating a VRML model used to adaptively transforming a graphic data of an object comprised of one or more triangles, the method including determining at least one triangle to be collapsed in the object, a triangle collapse sequence, and a collapsing vertex to be created by collapse of the at least one triangle; generating a coordIndex node in which information regarding the triangles comprised in the object are arranged in the triangle collapse sequence; generating a lodSequence node including triangle collapse sequence information; generating a coord node in which coordinate information of vertices comprised in the object and coordinate information of the collapsing vertex are arranged; and generating a coordStart node that refers to a position of the coordinate information of the collapsing vertex arranged in the coord node.

According to a further aspect of the present invention, there is provided a method of transforming a graphic data of an object comprising a plurality of triangles, the method including determining at least one triangle to be collapsed among the plurality of triangles, determining a collapsing vertex to be created by collapsing the at least one triangle, and transforming the graphic data of the object based on the at least one triangle determined to be collapsed and the collapsing vertex.

According to a further aspect of the present invention, there is provided at least one computer readable medium storing instructions that control at least one processor for executing a method of transforming a graphic data of an object comprised of a plurality of triangles, the method including determining at least one triangle to be collapsed among the plurality of triangles, determining a collapsing vertex to be created by collapsing the at least one triangle, and transforming the graphic data of the object based on the at least one triangle determined to be collapsed and the collapsing vertex.

BRIEF DESCRIPTION OF THE DRAWINGS

These and/or other aspects, features, and advantages of the present invention will become apparent and more readily appreciated from the following description of exemplary embodiments, taken in conjunction with the accompanying drawings of which:

FIG. 21 illustrates node syntax in a LOD method according to an exemplary embodiment of the present invention;

FIG. 22 illustrates the structure of a lodSequence shown in FIG. 21;

DETAILED DESCRIPTION OF THE PREFERRED EMBODIMENTS

Figure 1A:
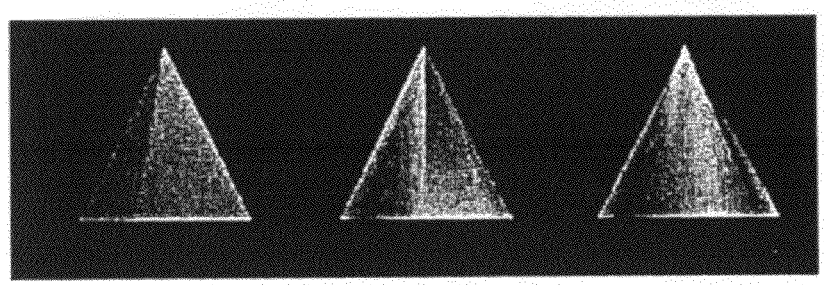
FIGS. 1A through 1C are diagrams for explaining a conventional level of detail (LOD)
Figure 1B:
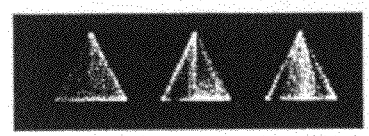
Figure 1C:

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 2:
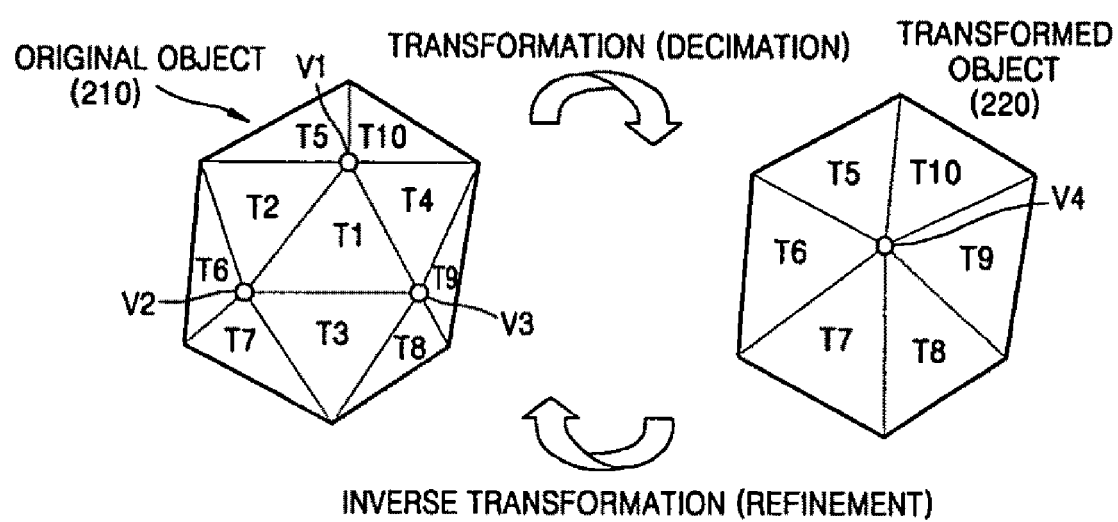
FIG. 2 illustrates the concept of a LOD according to an exemplary embodiment of the preset invention.

FIG. 2 illustrates the concept of a level of detail (LOD) according to an exemplary embodiment of the preset invention. An original object 210 includes 10 triangles T1 through T10. When the triangles T1 through T4 of the original object 210 are collapsed, a transformed object 220 includes 6 triangles T5 through T10.

In the present invention, to simplify and transform the graphic data of an object including triangles, a single triangle is collapsed to form a vertex. Referring to FIG. 2, the triangle T1 of the original object 210 has three vertices V1, V2, and V3. When the triangle T1 of the original object 210, is collapsed, the triangles T2, T3, and T4, which share two vertices among the three vertices V1, V2, and V3 with the triangle T1, are also collapsed. Accordingly, when the triangle T1 is collapsed, the four triangles T1 through T4 are collapsed. As a result, the transformed object 220 including of the triangles T5 through T10 is created. In other words, in a method of transforming an object according to an exemplary embodiment of the present invention, a collapsing vertex is created by collapsing a single triangle. A vertex V4 of the transformed object 220 corresponds to the collapsing vertex.

Figure 3:
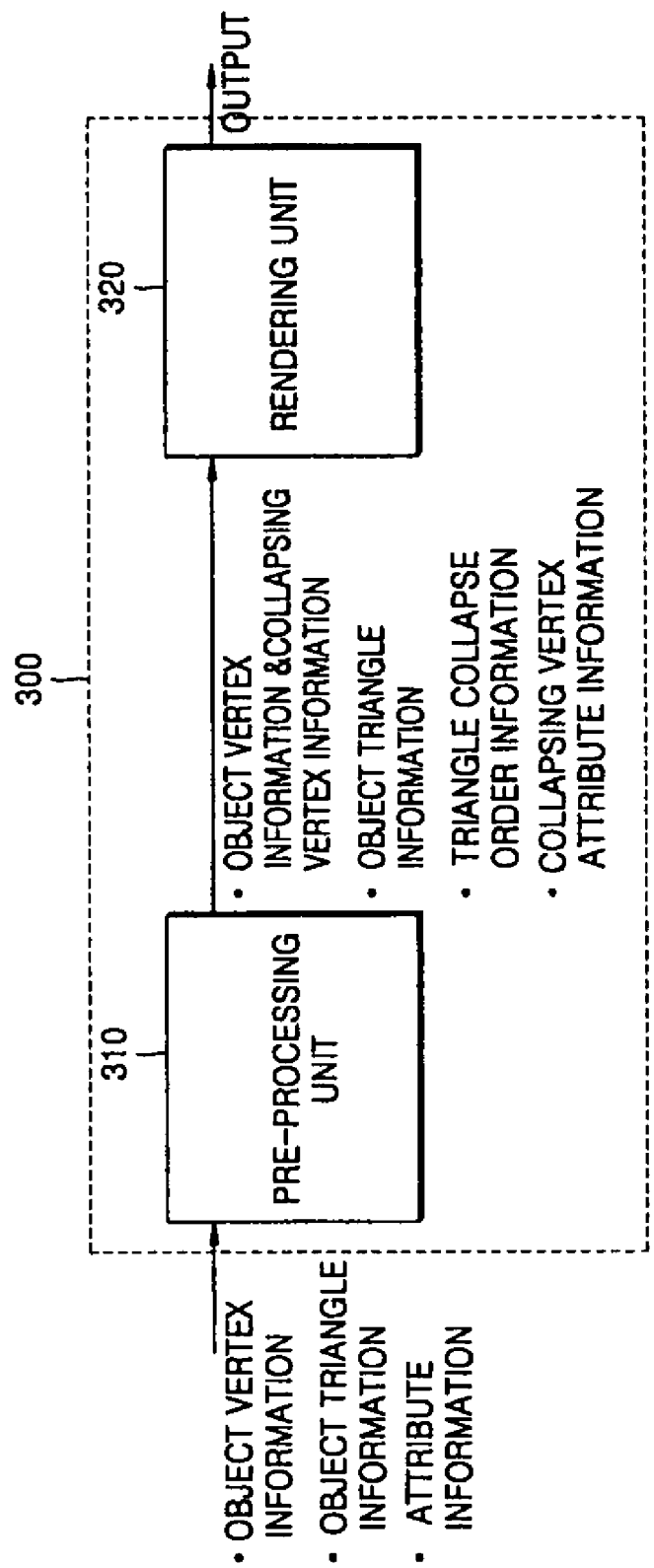
FIG. 3 is a schematic block diagram of an apparatus for implementing a LOD according to an exemplary embodiment of the present invention.

FIG. 3 is a schematic block diagram of an apparatus 300 for implementing a LQD according to an exemplary embodiment of the present invention. The apparatus 300 includes a pre-processing unit 310 and a rendering unit 320.

The pre-processing unit 310 receives information regarding an object to be rendered, pre-processes the information for a LOD, and provides the information regarding the object and information for the LOD to the rendering unit 320.

An object expressed in a graphic data according to an exemplary embodiment of the present invention includes vertices and triangles. The vertices are fundamental elements of the object and each triangle, i.e., a face of the object corresponds to three vertices. In general, faces constituting an object can be expressed by various polygons, and all polygons can be expressed by triangles. Thus, the present invention considers triangles as an example of the various polygons.

The pre-processing unit 310 receives information regarding vertices of an object to be rendered (hereinafter, referred to as object vertex information), object triangle formation, and attribute information as selective information; determines the sequence of triangles to be collapsed in the object (hereinafter, referred to as a triangle collapse sequence); and calculates for the LOD a collapsing vertex created by the collapse of the triangles and attribute information of the collapsing vertex. In other words, the pre-processing unit 310 provides the rendering unit 320 with the object vertex information, collapsing vertex information, the object triangle information, triangle collapse sequence information, and the collapsing vertex attribute information.

The rendering unit 320 receives the information regarding the object to be rendered and the information for the LOD from the pre-processing unit 310 and simultaneously transforms the object based on the information for the LOD and renders the object, thereby outputting a graphic data to be displayed.

Figure 4:
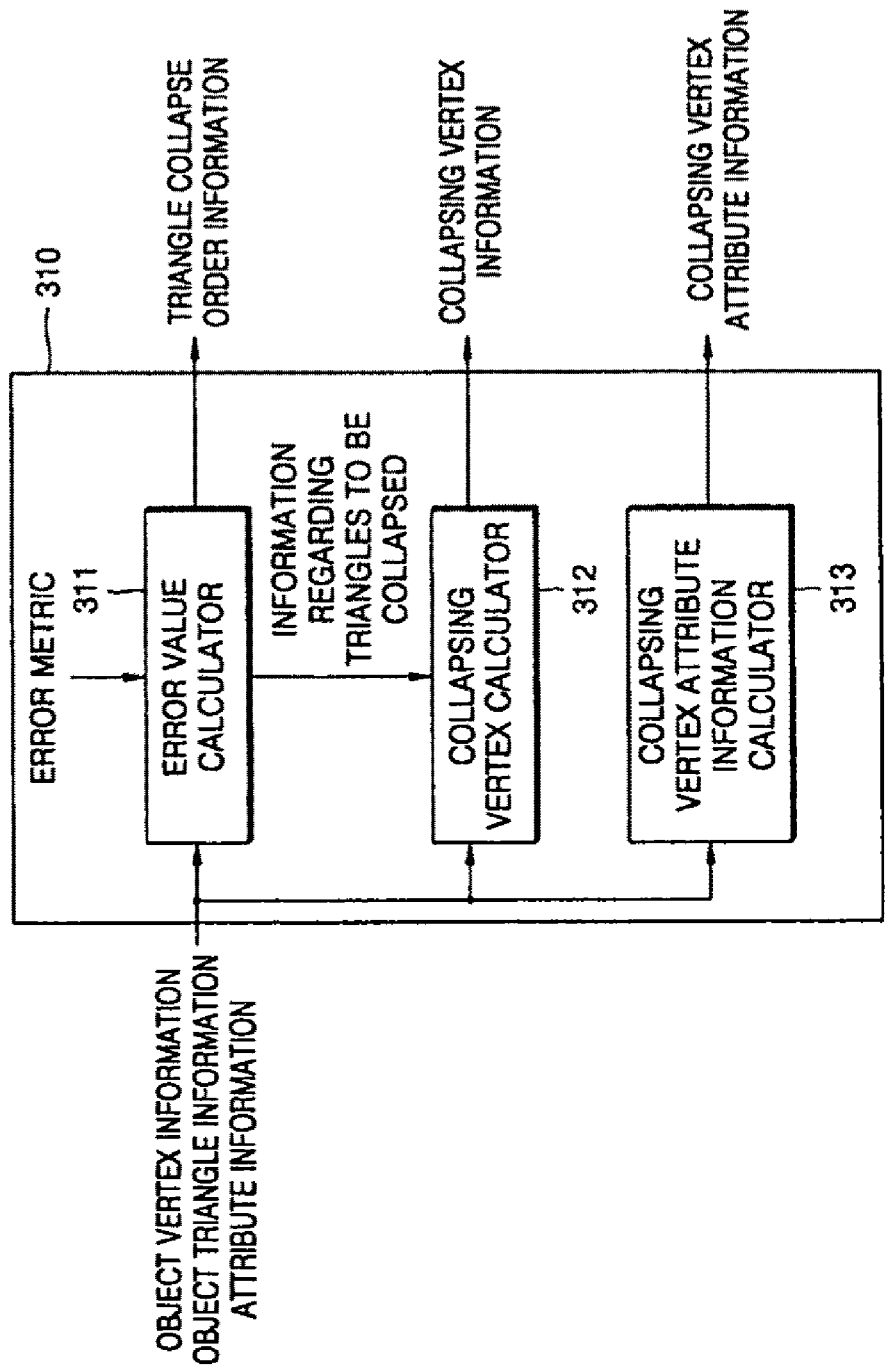
FIG. 4 is a detailed block diagram of a pre-processing unit shown in FIG. 3.

FIG. 4 is a detailed block diagram of the pre-processing unit 310 shown in FIG. 3. Referring to FIG. 4, the pre-processing unit 310 includes an error value calculator 311, a collapsing vertex calculator 312, and a collapsing vertex attribute information calculator 313.

The error value calculator 311 calculates an error value with respect to each of the triangles of the object based on an error metric. The error metric indicates how much a triangle influences object rendering and is used to find a triangle in the object, which does not influence much object rendering upon removing it. Since it is preferable to collapse the triangle which does not influence much object rendering upon removing it, it is important to determine the error metric so that the triangle which does not influence much object rendering upon removing it. A scheme of determining the error metric will be described in detail later.

A triangle having the least error value among error values calculated by the error value calculator 311 with respect to each of the triangles comprised of the object has the highest collapsing priority. In other words, triangles to be collapsed are sequenced in the ascending order of their error values. The rendering unit 320 (FIG. 3) collapses a triangle according to the determined triangle collapse sequence during LOD processing.

The collapsing vertex calculator 312 receives information regarding the triangles to be collapsed from the error value calculator 311 and calculates a collapsing vertex using the information received from the error value calculator 311, the object vertex information, and the object triangle information. In other words, when a triangle to be collapsed is determined, the collapsing vertex calculator 312 calculates a collapsing vertex that will be created by collapsing the triangle using vertex information of the triangle to be collapsed and the object triangle information and outputs collapsing vertex information to the rendering unit 320. A scheme of calculating the collapsing vertex will be described in detail later.

The collapsing vertex attribute information calculator 313 receives the information regarding triangle to be collapsed from the error value calculator 311 and calculates collapsing vertex attribute information using the information received from the error value calculator 311 and the attribute information regarding vertices of the object. The collapsing vertex attribute information may be calculated differently according to its characteristics or may be calculated using an average of vertices of the triangle to be collapsed to simplify calculation.

The rendering unit 320 performs the LOD by collapsing a triangle and creating the collapsing vertex using the collapsing vertex information and the collapsing vertex attribute information so that the graphic data of the object can be simplified.

Figure 5:
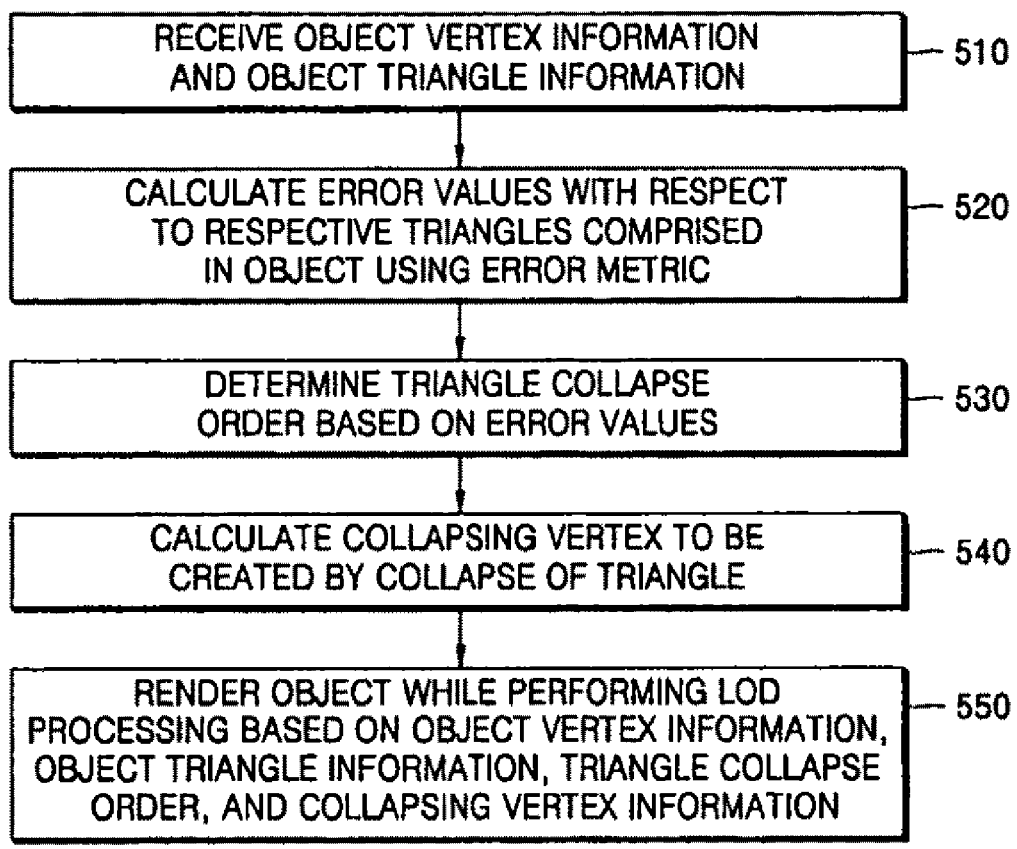
FIG. 5 is a flowchart of a LOD rendering method according to an exemplary embodiment of the present invention.

FIG. 5 is a flowchart of a LOD rendering method according to an exemplary embodiment of the present invention. In operation 510, a pre-processing unit receives information regarding vertices comprised in an object to be subjected to LOD rendering (i.e., object vertex information) and object triangle information. In operation 520, the pre-processing unit calculates an error value with respect to each of the triangles of the object using an error metric. In operation 530, the pre-processing unit determines a triangle collapse sequence based on error values calculated with respect to each of the triangles in the object. In operation 540, the pre-processing unit calculates a collapsing vertex to be created by collapsing a triangle. In operation 550, a rendering unit renders the object while performing LOD processing based on the object vertex information, the object triangle information, triangle collapse sequence information, and collapsing vertex information.

Figure 6:
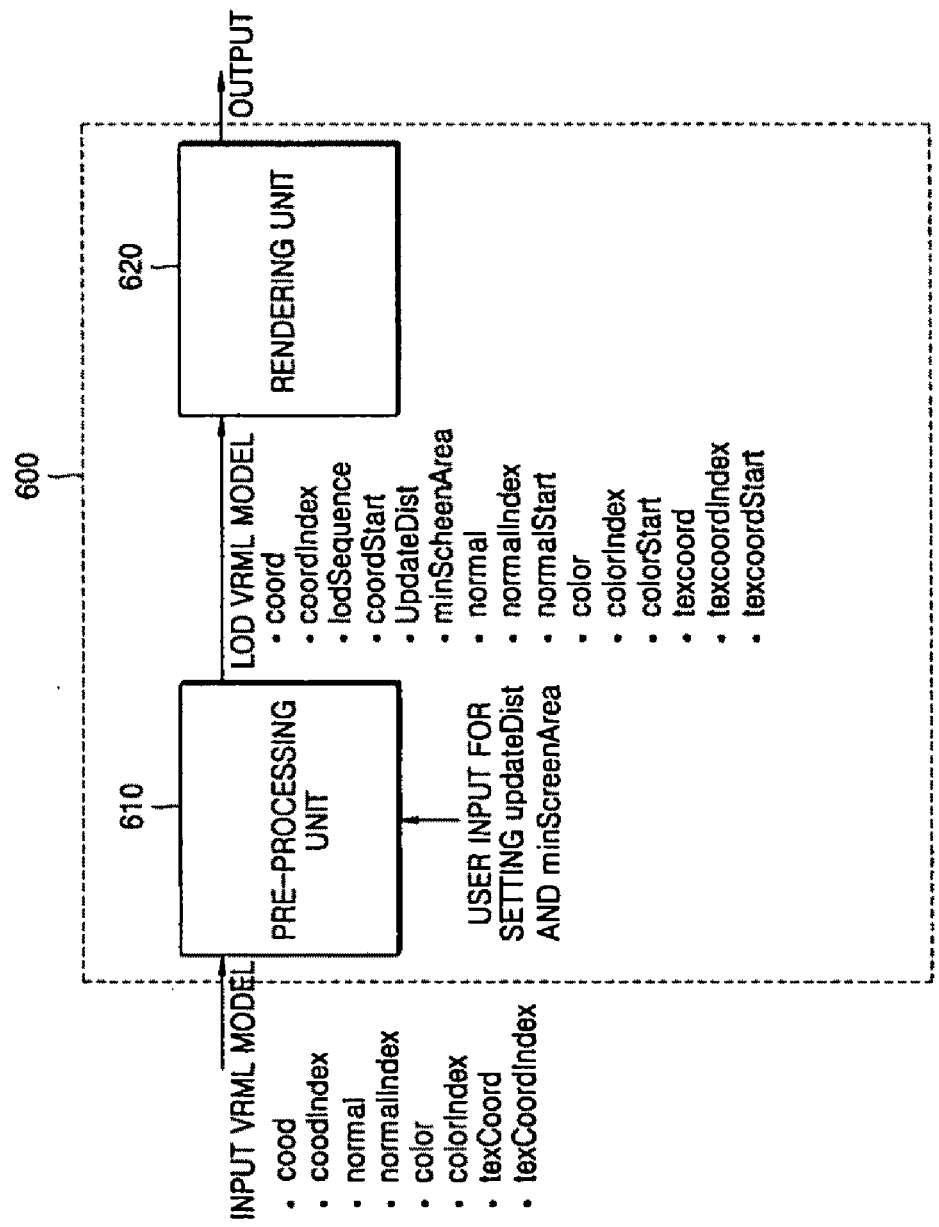
FIG. 6 is a schematic block diagram of an apparatus for implementing a LOD method in virtual reality modeling language (VRML) according to an exemplary embodiment of the present invention.

FIG. 6 is a schematic block diagram of an apparatus 600 for implementing a LOD method in virtual reality modeling language (VRML) according to an exemplary embodiment of the present invention. Referring to FIG. 6, the apparatus 600 includes a pre-processing unit 610 and a rendering unit 620.

The pre-processing unit 610 receives an input VRML model for an object to be rendered, performs pre-processing for LOD processing to create a LOD VRML model according to an exemplary embodiment of the present invention, and provides the LOD VRML model to the rendering unit 620.

The input VRML model for an object to be rendered includes "coord" containing coordinate information of vertices comprised in the object and "coordIndex" containing information regarding faces, i.e., triangles formed by connections among the vertices. In addition, the input VRML model may further selectively include attribute information such as "normal", "normalIndex", "color", "colorIndex", "texcoord", and "texcoordIndex". "Normal" refers to a normal value of a vertex, "normalIndex" refers to a face formed by vertices having the normal value, "color" refers to a color value of a vertex, "colorIndex" refers to a face formed by vertices having the color value, "texcoord" refers to a texture coordinate value of a vertex, and "texcoordIndex" refers to a face formed by vertices having the texture coordinate value.

The pre-processing unit 610 determines a triangle collapse sequence in the object based on the "coord" and the "coordIndex" and generates a lodSequence node. In addition, the pre-processing unit 610 calculates a collapsing vertex created by collapsing a triangle and generates a coordStart node having position information of the collapsing vertex. When the attribute information is present, the pre-processing unit 610 calculates a normal value of the collapsing vertex based on the "normal" and the "normalIndex", calculates a color value of the collapsing vertex based on the "color" and the "colorIndex", and calculates a texture coordinate value of the collapsing vertex based on the "texcoord" and the "texcoordIndex". In addition, the pre-processing unit 610 generates a normalStart node, a colorStart node, and a texcoordStart node, which have relevant attribute information of the collapsing vertex. Instead of calculating and newly generating the color value of the collapsing vertex, original color information on three vertices of the collapsing triangle may be preserved. In this case, the colorStart node will not be generated.

Moreover, the pre-processing unit 610 determines a level where the collapse of a triangle will start in an original object to generate a minScreenArea node and generates an updateDist node that gives an effect between a level and a subsequent level to gradually collapse a triangle in order to reduce a viewer's unpleasant feeling that may be caused by the collapse of a triangle. The pre-processing unit 610 provides the LOD VRML model including the generated nodes to the rendering unit 620.

The rendering unit 620 receives the LOD VRML model from the pre-processing unit 610 and renders the object while transforming the object, thereby outputting graphic data to be displayed.

Figure 7:
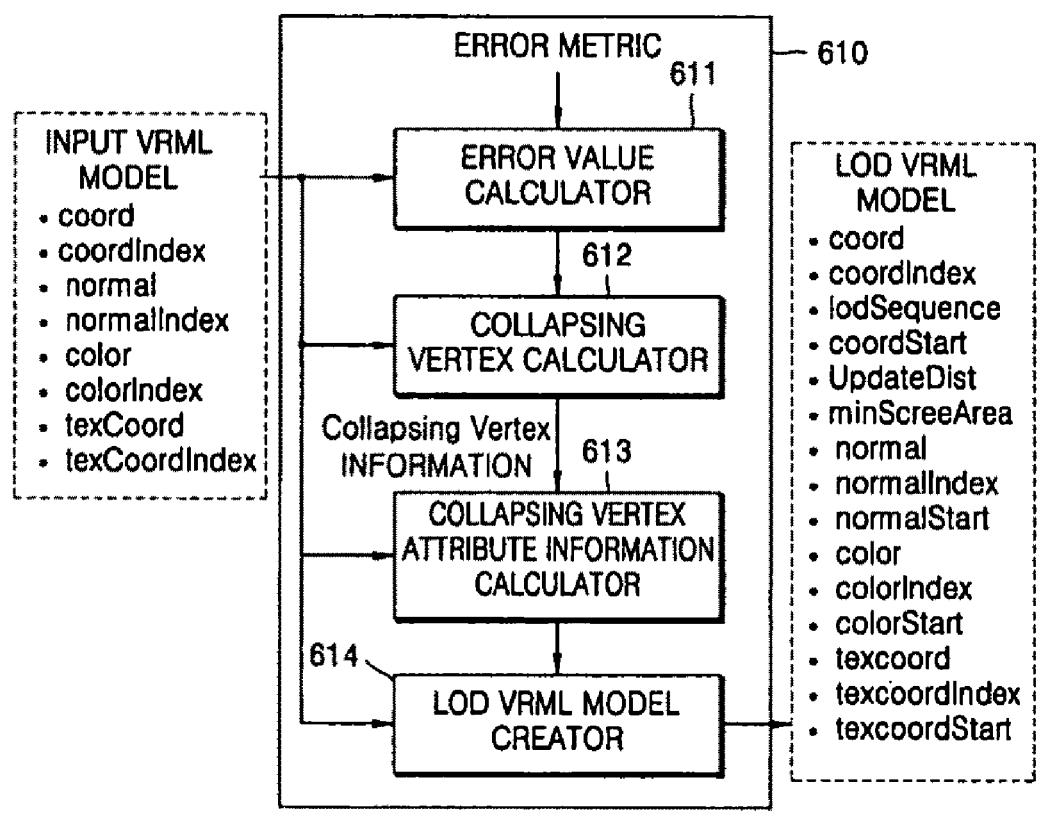
FIG. 7 is a detailed diagram of a pre-processing unit shown in FIG. 6.

FIG. 7 is a detailed diagram of the pre-processing unit 610 shown in FIG. 6. Referring to FIG. 7, the pre-processing unit 610 includes an error value calculator 611, a collapsing vertex calculator 612, a collapsing vertex attribute information calculator 613, and a LOD VRML model creator 614.

The error value calculator 611 calculates an error value with respect to each of the triangles of the object based on an error metric. A triangle having the least error value among error values calculated by the error value calculator 611 has the highest collapsing priority of. In other words, triangles to be collapsed are sequenced in the ascending order of their error values. The error value calculator 611 provides information regarding a triangle collapse sequence determined as described above, i.e., triangle collapse sequence information, to the collapsing vertex calculator 612 and the LOD VRML model creator 614.

The collapsing vertex calculator 612 receives information regarding the triangles to be collapsed from the error value calculator 611 and calculates a collapsing vertex using the information received from the error value calculator 611, object vertex information, i.e., "coord", and object triangle information, i.e., "coordIndex". The collapsing vertex calculator 612 provides collapsing vertex information obtained from the calculation to the collapsing vertex attribute information calculator 613 and the LOD VRML model creator 614.

The collapsing vertex attribute information calculator 613 receives the information regarding triangle to be collapsed from the error value calculator 611 and calculates collapsing vertex attribute information using the information received from the error value calculator 611 and the attribute information regarding vertices comprised in the object, i.e., "normal", "normalIndex", "color", "colorIndex", "texcoord", "texcoordIndex", etc. The collapsing vertex attribute information calculator 613 provides collapsing vertex attribute information obtained from the calculation to the LOD VRML model creator 614.

The LOD VRML model creator 614 receives the "coord", the "coordIndex", the collapsing vertex information, the collapsing vertex attribute information, and the triangle collapse sequence information, inserts the collapsing vertex information into the "coord" to generate a transformed coord node, inserts the normal information of the collapsing vertex into the "normal" to generate a transformed normal node, inserts the color information of the collapsing vertex into the "color" to generate a transformed color node, and inserts the texcoord information of the collapsing vertex into the "texcoord" to generate a transformed texcoord node. Instead of generating the transformed color node including the color information of the collapsing vertex, the original color information on the three vertices of the triangle to be collapsed may be used. In this case, a color node from which the original color information on the triangle to be collapsed is removed will be generated.

In addition, the LOD VRML model creator 614 generates a coordStart node that refers to the position of the collapsing vertex inserted into the "coord", a normalStart node that refers to the position of a collapsing vertex attribute inserted into the "normal", a colorStart node that refers to the position of a collapsing vertex attribute inserted into the "color", and a texcoordStart node that refers to the position of a collapsing vertex attribute inserted into the "texcoord". It is apparent that the attribute information such as "normal", "color", and "texcoord" is optional.

Further, in case that color of collapsing vertex is not newly generated, color start node is not generated.

Moreover, the LOD VRML model creator 614 arranges triangles in the "coordIndex" according to the triangle collapse sequence using the triangle collapse order information to generate a transformed coordIndex, arranges triangles in the "normalIndex" according to the triangle collapse sequence to generate a transformed normalIndex, arranges triangles in the "colorIndex" according to the triangle collapse sequence to generate a transformed colorIndex, and arranges triangles in the "texcoordIndex" according to the triangle collapse sequence to generate a transformed texcoordIndex. The LOD VRML model creator 614 also generates a lodSequence node that refers to the triangle collapse sequence information and generates an updateDist node and a minScreenArea node according to a user's input or setup information predetermined in a system. The LOD VRML model creator 614 outputs a LOD VRML model including the coord node, the coordIndex node, the lodSequence node, the coordStart node, the updateDist node, and the minScreenArea node to the rendering unit 620. When the attribute information is further present, the normal node, the normalIndex node, the normalStart node, the color node, the colorIndex node, the colorStart node, the texcoord node, the texcoordIndex node, the texcoordStart node, etc., may be further included in the LOD VRML model.

Figure 8:
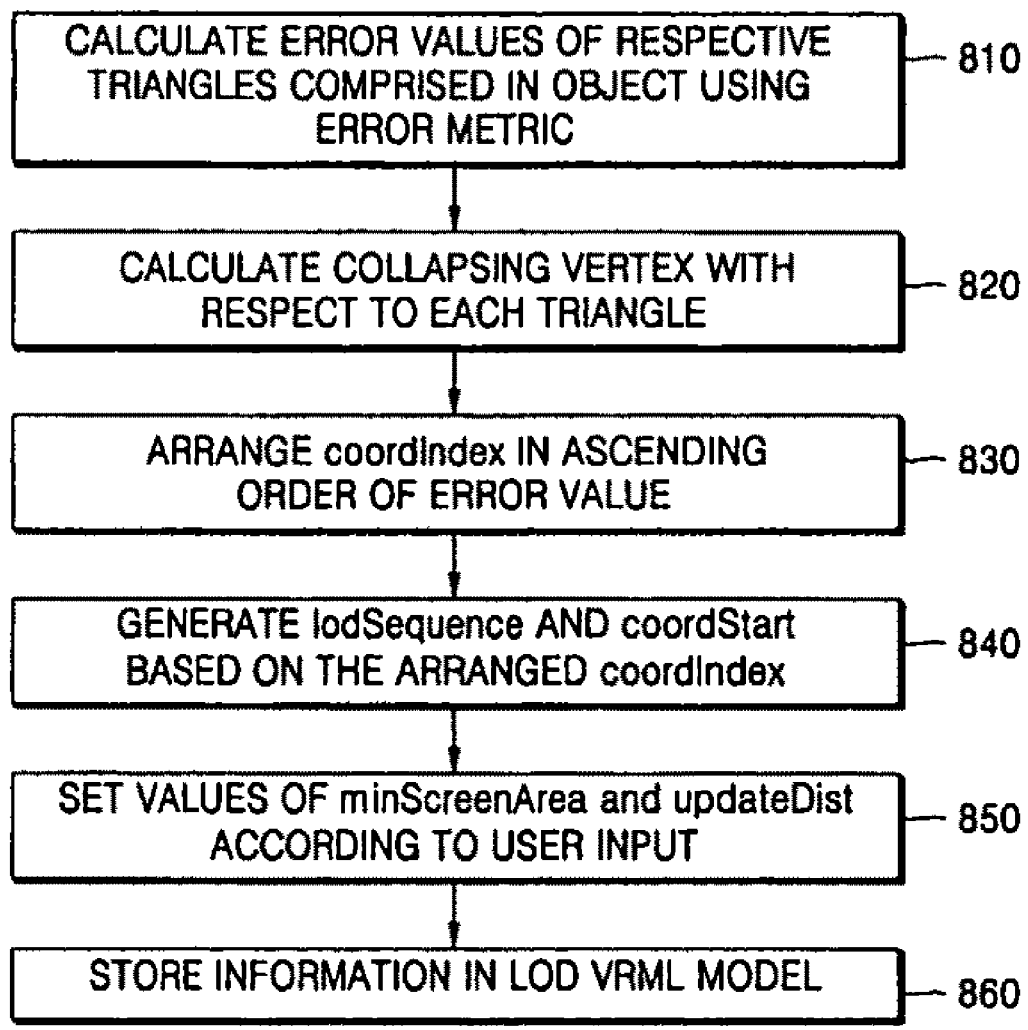
FIG. 8 is a flowchart of a pre-processing operation performed by the pre-processing unit shown in FIG. 7.

FIG. 8 is a flowchart of a pre-processing operation performed by the pre-processing unit 610 shown in FIG. 7.

In operation 810, the pre-processing unit 610 receives information "coord" and "coordIndex" regarding an object to be rendered according to a VRML model and calculates error values of respective triangles comprised in the object using an error metric. In operation 820, the pre-processing unit 610 calculates a collapsing vertex with respect to each triangle. In operation 830, the pre-processing unit 610 arranges triangles included in the coordIndex in ascending order of error value. In operation 840, the pre-processing unit 610 generates a lodSequence and a coordStart based on the arranged coordIndex. In operation 850, the pre-processing unit 610 sets a value of a minScreenArea and a value of an updateDist according to a user input or a predetermined setup value. In operation 860, the pre-processing unit 610 stores the coord, the coordIndex, the lodSequence, the coordStart, the updateDist, and the minScreenArea in a LOD VRML model.

Figure 9:
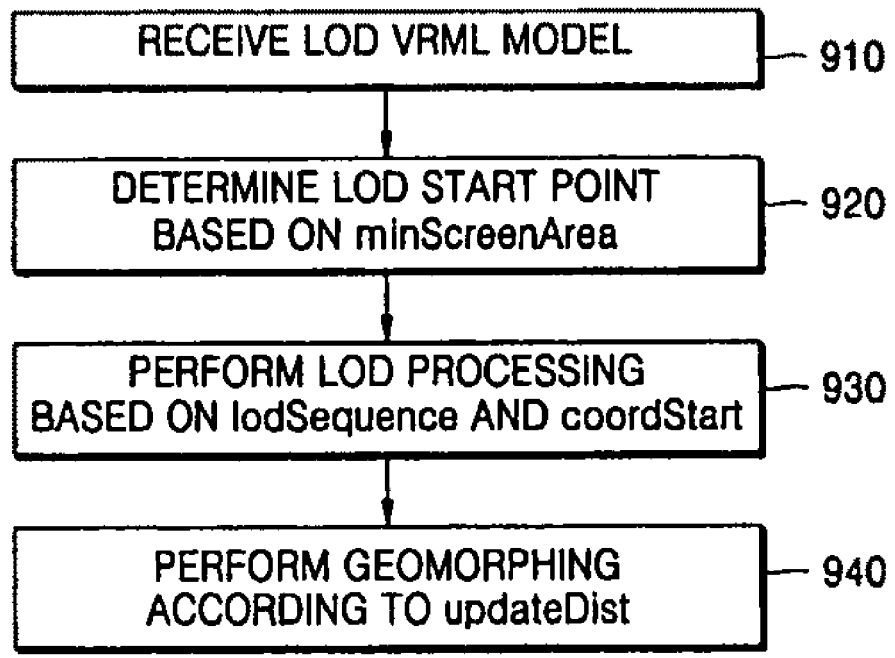
FIG. 9 is a flowchart of a rendering operation performed by a rendering unit shown in FIG. 6.

FIG. 9 is a flowchart of a rendering operation performed by the rendering unit 620 shown in FIG. 6.

Referring to FIG. 9, in operation 910 the rendering unit 620 receives the LOD VRML model generated by the pre-processing unit 610 (FIGS. 6 and 7). In operation 920, the rendering unit 620 determines a LOD start point based on the minScreenArea. In operation 930, the rendering unit 620 performs LOD processing based on the lodSequence AND the coordStart. In operation 940, the rendering unit 620 performs geomorphing according to the updateDist.

The following describes in detail an LOD method according to an exemplary embodiment of the present invention.

Error Metric

An error metric that is an indicator for determining a triangle to be collapsed according to an exemplary embodiment of the present invention will be described below.

As described above, the error metric indicates the effect of a triangle in an object. The result of obtaining an error metric with respect to each triangle F of an object is an error value of the triangle F, E(F). When a triangle has the largest E(F), it exerts the highest influence on the object. Accordingly, it is preferable that the triangle having the largest E(F) is the last triangle that is collapsed. Since a triangle having the least E(F) exerts the lowest influence on the object, the triangle may be determined as the first triangle that is collapsed.

The error metric, E(F), can be defined by Equation 1:

$$E(F) = E_{geometry}(F) + E_{attribute}(F). \quad (1)$$

The entire error E(F) can be expressed by the sum of an error regarding geometric characteristics, $E_{geometry}(F)$, and an error regarding attribute characteristics, $E_{attribute}(F)$.

With respect to the error $E_{geometry}(F)$, visual quality can be increased by removing earlier an inner triangle having a smaller curvature and a smaller area than other triangles. Accordingly, the error $E_{geometry}(F)$ can be defined by Equation 2:

$$E_{geometry}(F) = a * \text{curvature}(F) + b * \frac{\text{area}(F)}{\text{area(the largest triangle in mesh)}} + c * (|Nei_F| < 3), \quad (2)$$

where "curvature(F)" is the curvature of a triangle, i.e., the radius of curvature, and can be obtained as 1/(radius of sphere closest to F and neighboring triangles), "F" indicates a target triangle for which an error metric will be obtained, and $Nei_F$ indicates the number of triangles neighboring the target triangle. In other words, the curvature(F) is the radius of curvature of a sphere that can be formed to be closest to a face formed by the target triangle and its neighboring triangles.

In addition, "area(F)/area(the largest triangle in mesh)" indicates the degree of influence of the area of the target triangle and is a ratio of the area of the target triangle to the area of the largest triangle in the object.

Figure 10A:
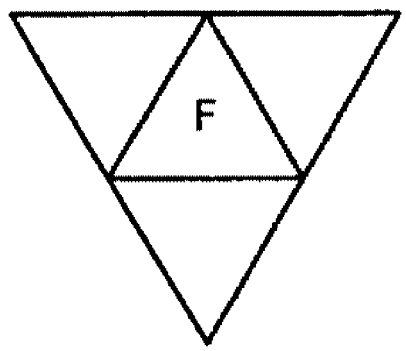
FIGS. 10A through 10D illustrate a concept used to calculate an error metric according to an exemplary embodiment of the present invention.
Figure 10B:
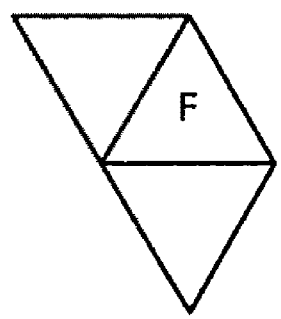

"$|Nei_F|<3$" indicates whether the target triangle is located at a border. Since $Nei_F$ is the number of triangles neighboring the target triangle F, it is determined whether the number of neighboring triangles is less than 3. For example, the target triangle F shown in FIG. 10A has three neighborhoods, but the target triangle F shown in FIG. 10B has two neighborhoods. Collapsing the triangle F having three neighborhoods as shown in FIG. 10A exerts less influence on object rendering than collapsing the triangle F having two neighborhoods as shown FIG. 10B. Accordingly, $|Nei_F|<3$ is an indicator for identifying triangles that are located at the border and thus should not be collapsed.

Figure 10C:
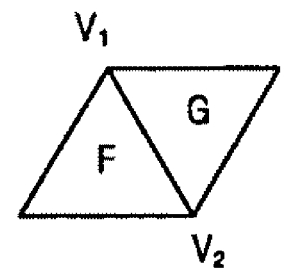
Figure 10D:
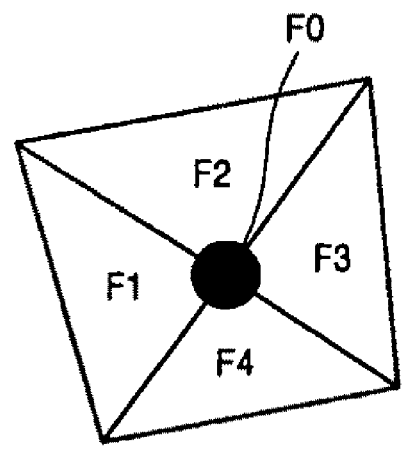

With respect to the error $E_{attribute}(F)$, visual quality can be increased by removing earlier a triangle having less color change between adjacent triangles and having less change in a normal line and a texture coordinate value than other triangles. Accordingly, the error $E_{attribute}(F)$ is defined by Equation 3:

$$E_{attribute}(F) = d \cdot IsFaceSharp + e \sum_{i=0}^{|Nei_F|-1} CA(F, Nei_F(i)) + f \sum_{i=0}^{|Nei_F|-1} NA(F, Nei_F(i)), \quad (3)$$

where $Nei_F$ is the number of neighborhoods of a face "i", "$CA(F,G)=|C_F(V_1)-C_G(V_1)|+|C_F(V_2)-C_G(V_2)|$" indicates variation of color, "$TA(F,G)=|T_F(V_1)-T_G(V_1)|+|T_F(V_2)-T_G(V_2)|$" indicates variation of a texture coordinate value, and "$NA(F,G)=|N_F(V_1)-N_G(V_1)|+|N_F(V_2)-N_G(V_2)|$" indicates variation of a normal. Referring to FIG. 10C, "F" denotes a target triangle for which an error metric is obtained, "G" denotes one of the triangles neighboring the target triangle F, and $V_1$ and $V_2$ denotes vertices shared by the target triangle F and the neighboring triangle G. Here, IsFaceSharp(F) is used to handle a case where a vertex shared by two or more triangles has different texture coordinate values. In detail, when different texture coordinate values are given to a single vertex, the vertex is defined as "sharp" and IsFaceSharp(F) has a value of "1". Alternatively, when a single texture coordinate value is given to the vertex, IsFaceSharp(F) has a value of "0". Referring to FIG. 10D, when a vertex F0 shared by four triangles F1, F2, F3, and F4 has different texture coordinate values, the vertex F0 is defined as "sharp". Otherwise, the vertex F0 is not defined as "sharp".

The variation of color is defined by the sum of a difference between a color value of the vertex $V_1$ of the target triangle F and a color value of the vertex $V_1$ of the neighboring triangle G and a difference between a color value of the vertex $V_2$ of the target triangle F and a color value of the vertex $V_2$ of the neighboring triangle G.

The variation of a normal is defined by the sum of a difference between a normal value of the vertex $V_1$ of the target triangle F and a normal value of the vertex $V_1$ of the neighboring triangle G and a difference between a normal value of the vertex $V_2$ of the target triangle F and a normal value of the vertex $V_2$ of the neighboring triangle G.

The following describes the coefficients appearing in Equations 2 and 3. A default value of each coefficient is selected such that a term including the coefficient has a value between 0 and 1. The coefficient "a" is defined as the radius of curvature of a sphere having the least radius of curvature among all triangles of the object. Thus, "a*curvature(F)" has a value between 0 and 1. The coefficient "b" is defined as "1". Thus, the term including the coefficient "b" has a value between 0 and 1. The term including the coefficient "c" is used for a special purpose not to collapse triangles at the border. Accordingly, the coefficient "c" is defined as a predetermined large default value.

The coefficient "d" is used to prevent triangles mapped to different textures from collapsing, and therefore, the coefficient "d" is defined as a predetermined default value. Since the collapsing of triangles mapped to different texture gives less visual change than the collapsing of triangles at the border, the coefficient "d" has a smaller value than the coefficient "c". For example, when the coefficient "c" is set to a value of 100, the coefficient "d" may be set to a value of 10.

The coefficients "e" and "f" are defined as follows:

$$e = \frac{1}{3\max(CA)}$$
$$= \frac{1}{6\sqrt{(R_1-R_2)^2+(G_1-G_2)^2+(B_1-B_2)^2}}$$
$$= \frac{1}{6\sqrt{(1-0)^2+(1-0)^2+(1-0)^2}}$$
$$= \frac{1}{6\sqrt{3}}$$

$$f = \frac{1}{3\max(NA)} = \frac{1}{3*2*2} = \frac{1}{12}.$$

Error metrics, i.e., error values are obtained with respect to all triangles in an object to be rendered using the above-described calculation. Based on the error values, it can be determined which triangle is collapsed earlier than other ones when the object is transformed. In detail, a triangle having the least error value is determined as a first triangle to be collapsed and a triangle having the second least error value is determined as a second triangle to be collapsed. In a pre-processing operation, the triangles of the object to be rendered are arranged in the ascending order of their error values using the calculated error values and information regarding the arranged order, i.e., triangle collapse sequence information is provided for a rendering operation. Then, in the rendering operation, a triangle collapse is performed based on the triangle collapse sequence information during LOD processing.

Calculation of Collapsing Vertex

After a triangle to be collapsed in an object to be rendered or a triangle collapse sequence is determined based on the result of error metric calculation, a collapsing vertex that will be created when the triangle is collapsed is calculated. It is preferable that the collapsing vertex newly created by a triangle collapse in the object changes the original shape of the object as little as possible.

Figure 11:
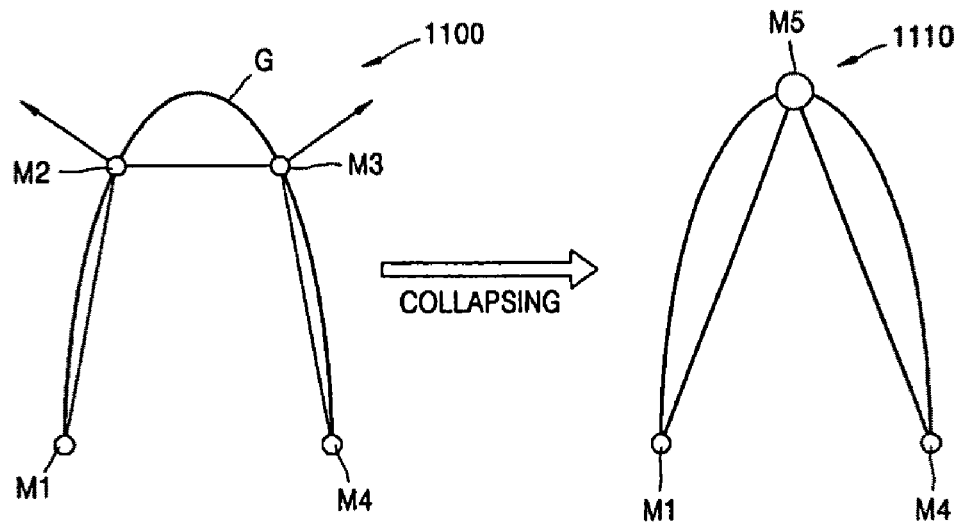
FIG. 11 illustrates a concept of creating a collapsing vertex by collapsing a single triangle according to an exemplary embodiment of the present invention.

FIG. 11 illustrates a concept of creating a collapsing vertex by collapsing a single triangle according to an exemplary embodiment of the present invention. Referring to FIG. 11, reference numeral 1100 denotes a cross-section of an object before a triangle collapse and reference numeral 1110 denotes a cross-section of the object after the triangle collapse.

Before the triangle collapse, the cross-section 1100 includes vertices M1, M2, M3, and M4. It is preferable that a triangle defined by the vertices M2 and M3 (the other vertex of the triangle is not shown since FIG. 11 is a cross sectional view) is collapsed to create a collapsing vertex such that an original shape G of the object changes as little as possible. However, the original shape G of the object cannot be known. Thus, it is important to select a collapsing vertex M5 that approximates a transformed shape of the object to the original shape G.

Figure 12:
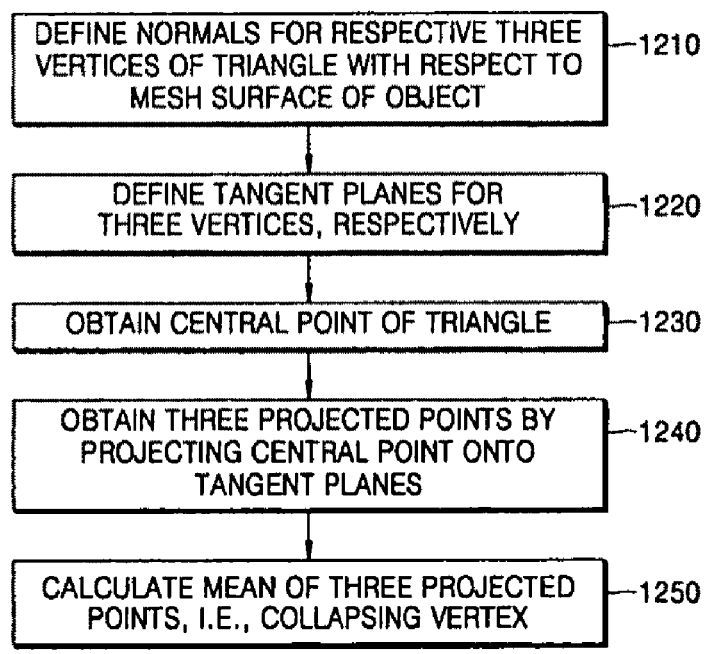
FIG. 12 is a flowchart of a procedure for creating a collapsing vertex by collapsing a single triangle according to an exemplary embodiment of the present invention.

FIG. 12 is a flowchart of a procedure for creating a collapsing vertex by collapsing a single triangle according to an exemplary embodiment of the present invention. In operation 1210, vertices V1, V2, and V3 of a triangle to be collapsed are defined and normals N1, N2, and N3 for the respective vertices V1, V2, and V3 on the surface of a mesh are defined. In operation 1220, planes that include a vertex Vi and are perpendicular to a normal Ni are defined as tangent planes P1, P2, and P3. In operation 1230, a central point of the triangle to be collapsed, i.e., C=(V1+V2+V3)/3 is obtained. In operation 1240, three projected points C1, C2, and C3 are obtained by projecting the central point C of the triangle onto the individual tangent planes P1, P2, and P3. In operation 1250, a point created by the collapse of the triangle, i.e., a collapsing vertex V4 is calculated as (C1+C2+C3)/3, i.e., the mean of the three projected points C1, C2, and C3. The attribute of the collapsing vertex V4 is determined by the mean of attributes of the tangent planes P1, P2, and P3.

An example of the procedure for creating a collapsing vertex by collapsing a single triangle according to an exemplary embodiment of the present invention will be described with reference to FIGS. 13A through 13F below.

Figure 13A:
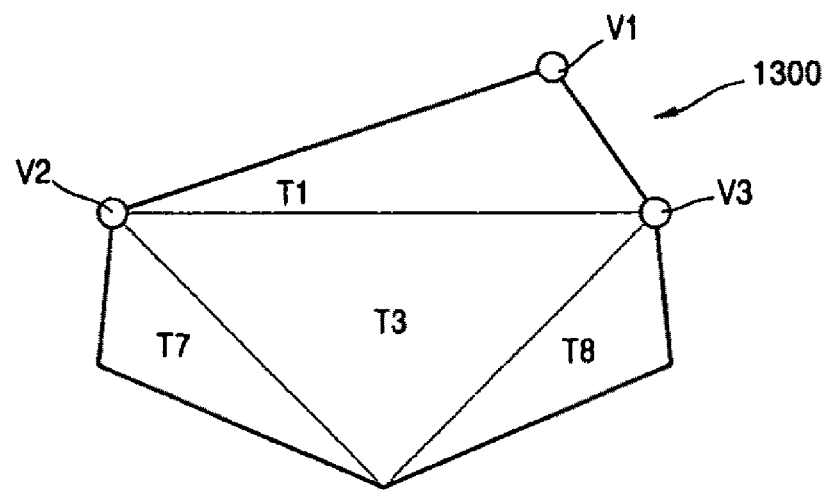
FIGS. 13A through 13F illustrate an example of the procedure for creating a collapsing vertex by collapsing a single triangle.

Referring to FIG. 13A, an object 1300 includes four triangles T1, T3, T7, and T8. The triangle T1 has vertices V1, V2, and V3. Let's assume that the triangle T1 has to be collapsed. While FIG. 2 shows the original object 210 when the triangle T1 is viewed from above, FIG. 13A shows the object 1300 when the triangle T1 of the original object 210 is viewed from the side to facilitate the explanation of an object in a three-dimensional (3D) view.

Figure 13B:
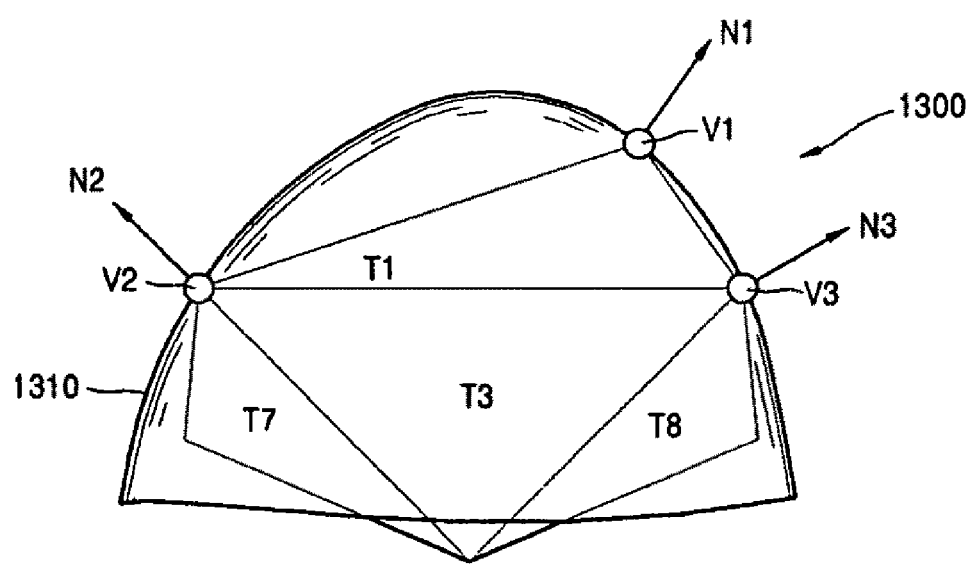

Referring to FIG. 13B, normal lines for the vertices V1, V2, and V3 of the triangle T1 to be collapsed on the surface of a mesh 1310 are defined as N1, N2, and N3, respectively.

Figure 13C:
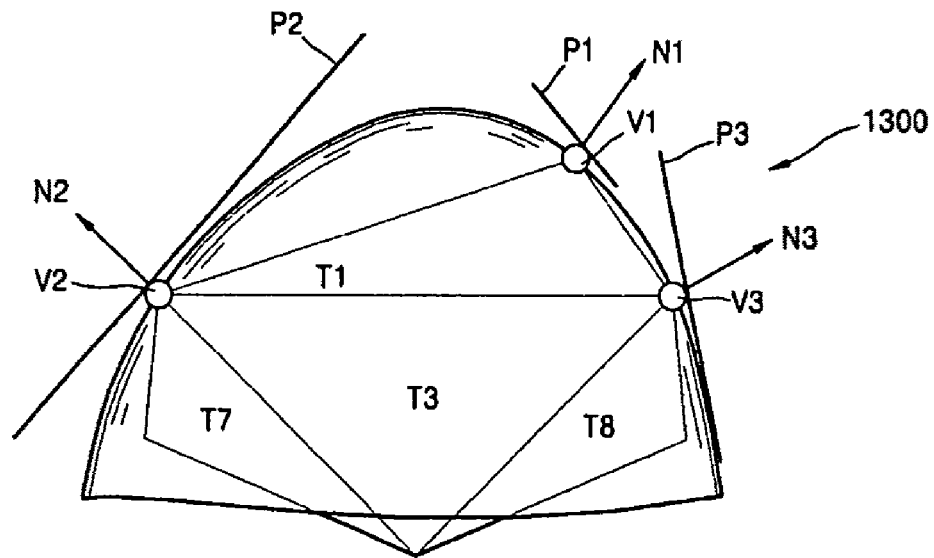

Referring to FIG. 13C, a plane that includes a vertex Vi and is perpendicular to a normal line Ni is defined as a tangent plane Pi. In other words, a plane that includes the vertex V1 and is perpendicular to the normal line N1 is defined as a tangent plane P1. A plane that includes the vertex V2 and is perpendicular to the normal line N2 is defined as a tangent plane P2. A plane that includes the vertex V3 and is perpendicular to the normal line N3 is defined as a tangent plane P3.

Figure 13D:
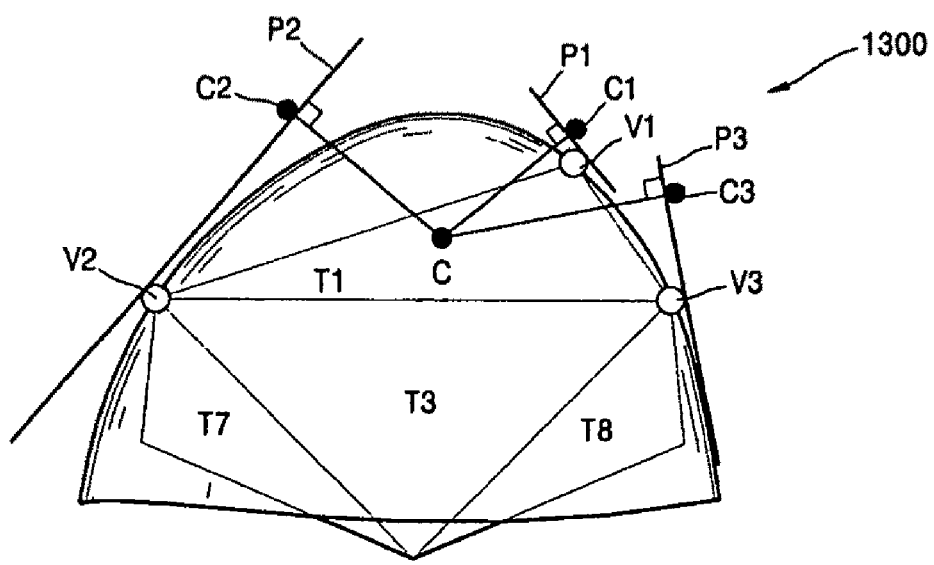

Referring to FIG. 13D, a central point of the triangle T1 to be collapsed is defined as C=(V1+V2+V3)/3. The central point C is projected onto the tangent planes P1, P2, and P3, thereby obtaining three projected points C1, C2, and C3.

Figure 13E:
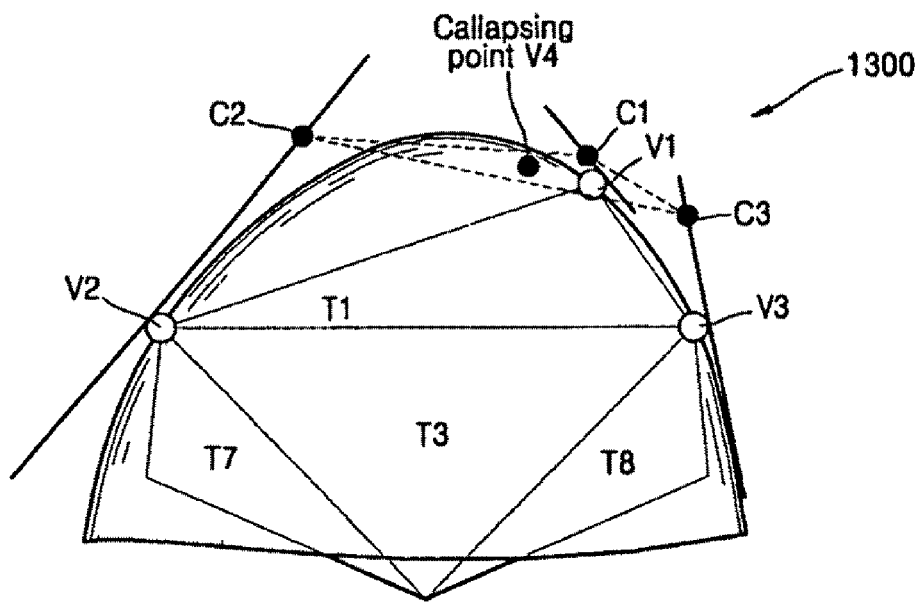

Referring to FIG. 13E, a point created by collapsing the triangle T1, i.e., a collapsing vertex V4 is calculated as the mean of the three projected points C1, C2, and C3, i.e., (C1+C2+C3)/3.

Figure 13F:
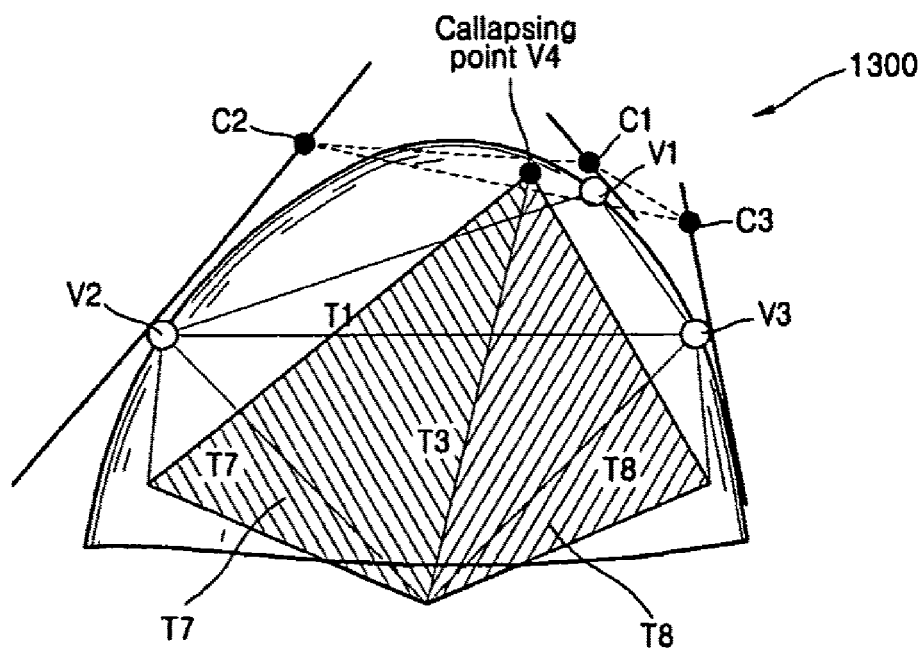

Accordingly, an object transformed to include the collapsing vertex V4 created by collapsing the triangle T1 is drawn like in FIG. 13F.

The attribute of a collapsing vertex may be defined as the mean of attribute values defined for three projected points. Alternatively, the more elaborate attribute of the collapsing vertex may be obtained by considering the characteristics of the respective vertices of a triangle to be collapsed. Hereinafter, a method of obtaining the attribute of a collapsing vertex according to the characteristics of the respective vertices of a triangle to be collapsed will be described. The attribute of a collapsing vertex may include a texture coordinate value, color, and a normal vector.

The texture coordinate value of a collapsing vertex may be obtained as follows. The texture coordinate value of the collapsing vertex may be obtained to be influenced most by a texture coordinate value of a vertex closest to the collapsing vertex among three vertices of a triangle to be collapsed.

Figure 14:
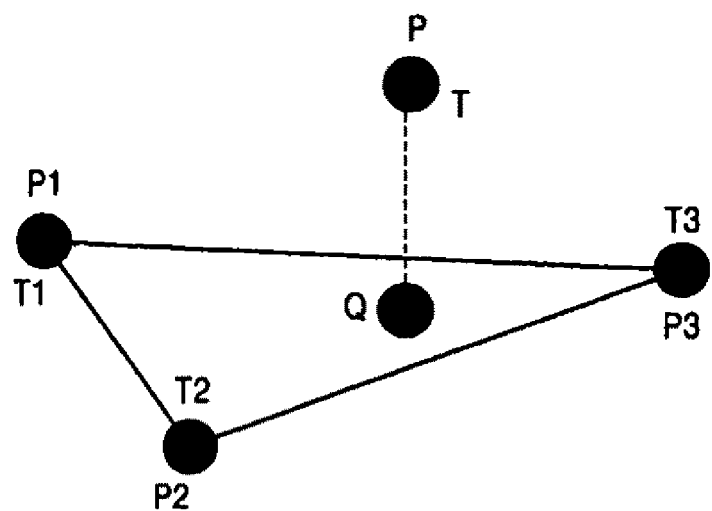
FIG. 14 illustrates a method of obtaining a texture coordinate value of the collapsing vertex according to an exemplary embodiment of the present invention.

Referring to FIG. 14, P1, P2, and P3 denote coordinate values of three vertices of a triangle; T1, T2 and T3 denote texture coordinate values of the respective three vertices; P denotes a coordinate value of a collapsing vertex; and T denotes a texture coordinate value of the collapsing vertex. When P is closer to P3 than P1 or P2, T is supposed to be influenced more by T3 than T1 or T2. Here, P can be expressed by an equation P=a1*P1+a2*P2+a3*P3. When a1, a2, and a3 obtained from the equation are used, T can be expressed as T=a1*T1+a2*T2+a3*T3. However, since P does not exist on a plane formed by P1, P2, and P3, Q is obtained by projecting P onto the triangle. Q can be expressed by an equation Q=a1*P1+a2*P2+a3*P3. The coefficients a1, a2, and a3 are referred to as barycentric coordinates of Q and defined by an equation $$\frac{a1}{S_{P_2QP_3}} = \frac{a2}{S_{P_1QP_3}} = \frac{a3}{S_{P_1QP_2}}$$

where a1+a2+a3=1. Here, $S_{ABC}$ denotes an area of a triangle having vertices A, B, and C. The coefficients a1, a2, and a3 can be redefined as follows:

$$b_1 = S_{P_2QP_3}$$
$$b_2 = S_{P_1QP_3}$$
$$b_3 = S_{P_1QP_2}$$
$$b = b_1 + b_2 + b_3$$
$$a_1 = \frac{b_1}{b}, a_2 = \frac{b_2}{b}, a_3 = \frac{b_3}{b}.$$

Accordingly, the texture coordinate value T=a1*T1+a2*T2+a3*T3 can be obtained using the coefficients a1, a2, and a3 obtained using the above equations.

The normal vector of a collapsing vertex may be obtained as follows. The normal vector of the collapsing vertex may be obtained to be influenced most by a normal vector of a vertex closest to the collapsing vertex among the three vertices of the triangle to be collapsed in a spherical coordinate system.

Figure 15:
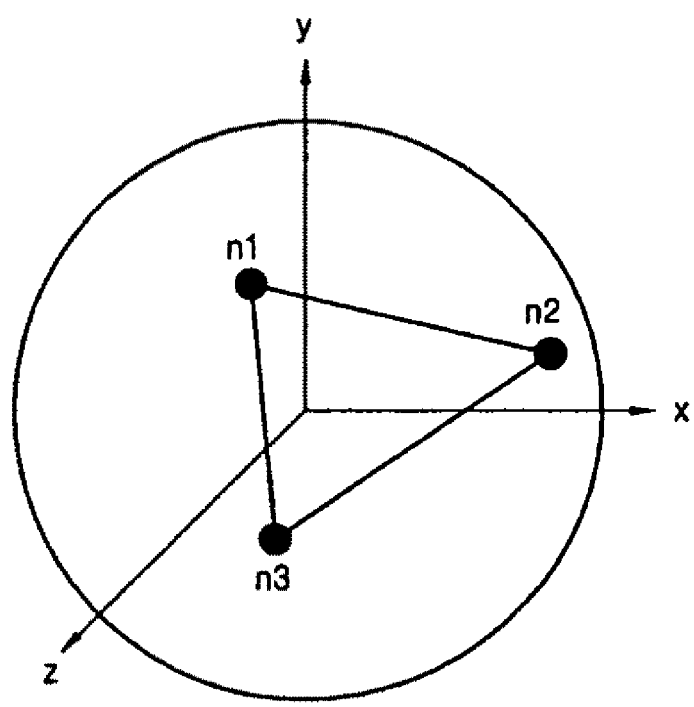
FIG. 15 illustrates a method of obtaining a normal vector of the collapsing vertex according to an exemplary embodiment of the present invention.

A normal vector is positioned on a surface of a sphere having a radius of 1 in the spherical coordinate system. According to this feature, normal vectors for three vertices of a triangle may be expressed as shown in FIG. 15 in the spherical coordinate system; and n1, n2, and n3 refer to normal vectors of the three vertices of a triangle to be collapsed, which are expressed in the spherical coordinate system, and "n" refers to a normal vector of a collapsing vertex expressed in the spherical coordinate system:
n1=(1,theta1,phi1)
n2=(1,theta2,phi2)
n3=(1,theta3,phi3)
n=(1,theta,phi).

Accordingly, the normal vector of the collapsing vertex can be obtained by interpolating (theta,phi) in the spherical coordinate system. Here, the new normal vector "n" is expressed as n=a*n1+b*n2+c*n3 where a+b+c=1. The coefficient "a", "b", and "c" are expressed using barycentric coordinates used when the texture coordinate value is obtained.

Thereafter, the normal vector of the collapsing vertex can be obtained in an xyz coordinate system by converting (1,theta,phi) to (x,y,z).

Figure 16:
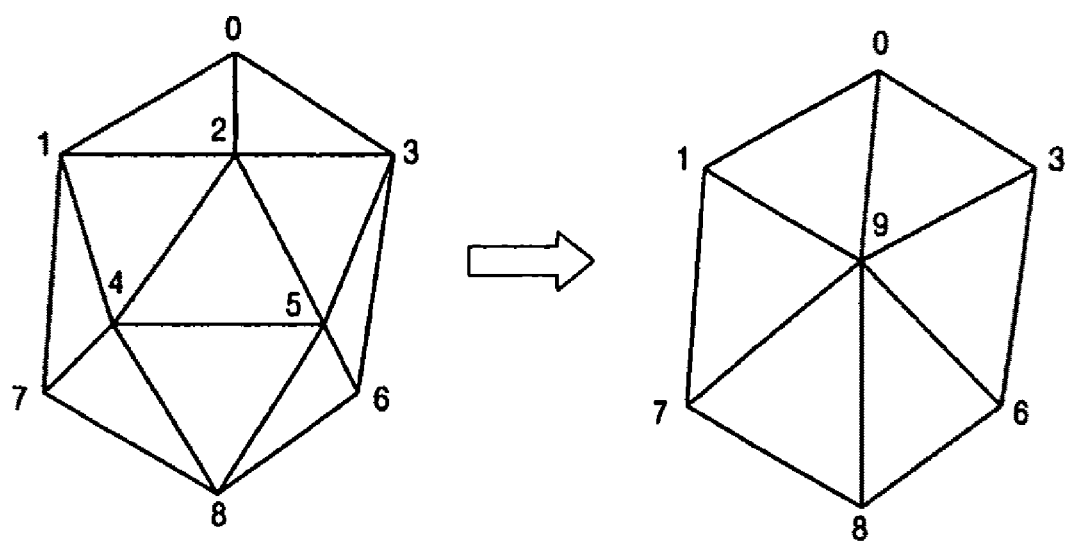
FIG. 16 illustrates a method of obtaining color of the collapsing vertex according to an exemplary embodiment of the present invention.

The color of a collapsing vertex may be obtained as follows. Referring to FIG. 16, when a triangle having vertices 2, 4, and 5 is collapsed to a new vertex 9, if ambient colors are blended, the color of the vertex 9 may be totally different from the ambient colors. Accordingly, instead of generating a new color for the new vertex 9, original colors of the three vertices 2, 4, and 5 may be preserved after the collapse. In other words, the new vertex 9 has the original colors of the respective three vertices 2, 4, and 5 of the collapsed triangle, that is, only the color of the collapsed triangle is removed. For example, when the vertices 2, 4, and 5 are red, green, and blue, respectively, red, green and blue colors may be allocated to the collapsing vertex 9. As a result, even when a triangle having vertices 1, 4, and 7 is collapsed to a new triangle having vertices 1, 9, and 7, the new triangle (1,9,7) has the color of the original triangle (1,4,7).

For example, a model may be created as follows:

| original coordIndex [ |
|---|
| 2, 1, 7, −1, |
| 0, 1, 5, −1, |
| 0, 4, 2, −1, |
| 2, 3, 1, −1, |
| 0, 5, 4, −1, |
| 1, 3, 5, −1, |
| 2, 4, 3, −1, |
| 4, 5, 3, −1, |
| 0, 7, 1, −1, |
| 6, 0, 2, −1, |
| 6, 2, 7, −1, |
| 6, 7, 0, −1] |
| original colorIndex [ |
| c1, c2, c3, −1, |
| c4, c5, c6, −1, |
| c7, c8, c9, −1, |
| c10, c11, c12, −1, |
| c13, c14, c15, −1, |
| c16, c17, c18, −1, |
| c19, c20, c21, −1, |
| c22, c23, c24, −1, |
| c25, c26, c27, −1, |
| c28, c29, c30, −1, |
| c31, c32, c33, −1, |
| c34, c35, c36, −1]. |

When a triangle (6,7,0) is collapsed to a new vertex 8 in the above model, colorIndex is allocated as follows:

| new coordIndex [ |
|---|
| 2, 1, 8, −1, |
| 8, 1, 5, −1, |
| 8, 4, 2, −1, |
| 2, 3, 1, −1, |
| 8, 5, 4, −1, |
| 1, 3, 5, −1, |
| 2, 4, 3, −1, |
| 4, 5, 3, −1]. |

It can be inferred from the new coordIndex that a triangle (6,0,7) and triangles (6,2,7), (6,0,2), and (0,7,1) which share two vertices with the triangle (6,0,7) have been removed, and with respect to triangles sharing a single vertex with the triangle (6,0,7) the single shared vertex has been changed to the new vertex 8. In other words, a triangle (2,1,7) is changed to a triangle (2,1,8); a triangle (0,1,5) is changed to a triangle (8,1,5); a triangle (0,4,2) is changed to a triangle (8,4,2); and a triangle (0,5,4) is changed to a triangle (8,5,4).

| New colorIndex [ |
|---|
| c1, c2, c3, −1, |
| c4, c5, c6, −1, |
| c7, c8, c9, −1, |
| c10, c11, c12, −1, |
| c13, c14, c15, −1, |
| c16, c17, c18, −1, |
| c19, c20, c21, −1, |
| c22, c23, c24, −1]. |

According to the new colorIndex, the four color values from the bottom of the original colorIndex are removed, and even when coordinates of a vertex of a triangle is changed, color of the vertex is preserved. For example, (2,1,7) in the original coordIndex is changed to (2,1,8) in the new coordIndex, but (c1,c2,c3) in the original colorIndex is kept as it is in the new colorIndex.

LOD Level and Geomorphing

Figure 17:
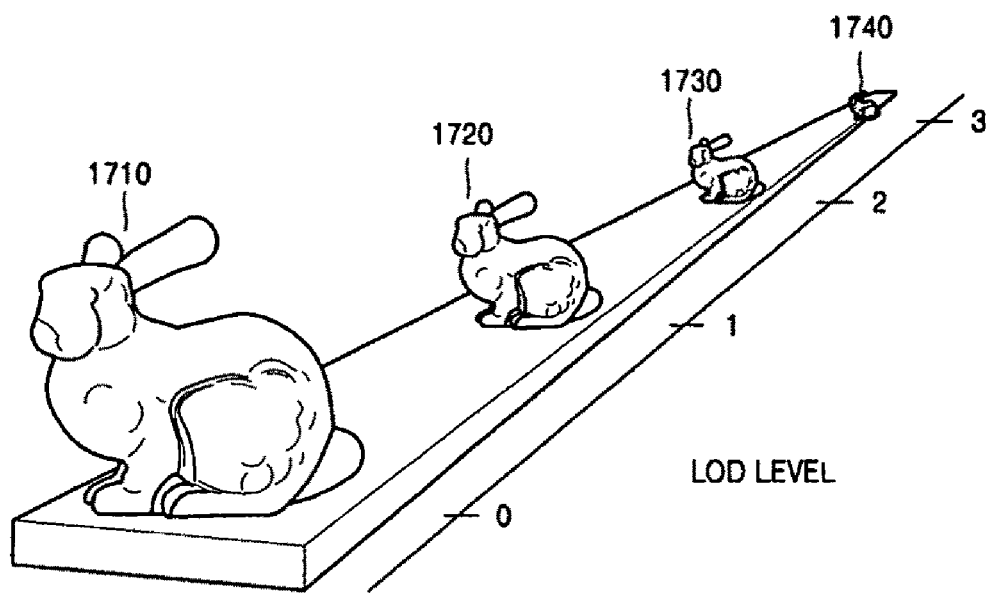
FIG. 17 is a diagram for explaining seamless rendering according to an exemplary embodiment of the present invention.

FIG. 17 is a diagram for explaining seamless rendering according to an exemplary embodiment of the present invention. Referring to FIG. 17, when LOD level=0, an original image 1710 is rendered without any transformation. When LOD level=1, subsequent to the LOD level of 0, a first-stage transformed object 1720 resulting from a series of collapses triangle is rendered. LOD level=2 and LOD level=3 are subsequent to the LOD level of 1 and the LOD level of 2, respectively, and produce a second-stage transformed object 1730 and a third-stage transformed object 1740, respectively, as rendering results.

Figure 18:
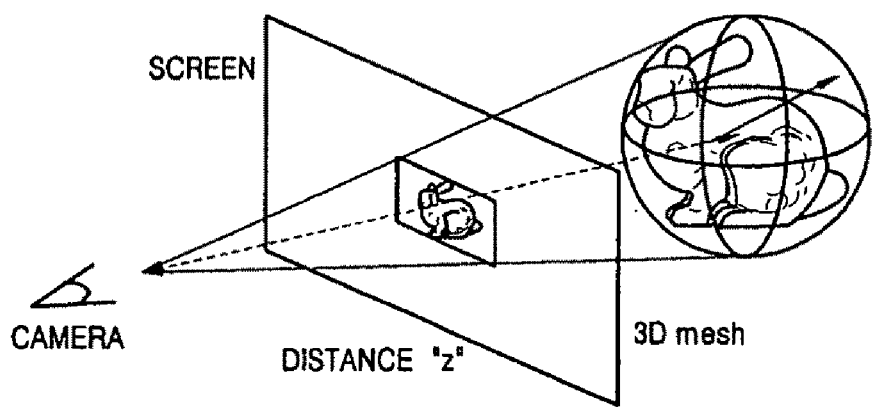
FIG. 18 illustrates the distance relationship between a camera and a three-dimensional (3D) mesh in the seamless rendering of FIG. 14.

FIG. 18 illustrates the distance relationship between a camera and a 3D object formed using a screen and a mesh. When "q" is less than a predetermined threshold, that is, when $$q = \frac{\text{area(rasterized mesh)}}{\text{area(screen)}} < \text{threshold,}$$

a simplification process is performed. Here, "q" is a ratio of the area of the 3D object projected onto the screen to the area of the entire screen. When the ratio "q" is less than the predetermined threshold, simplification or transformation of the 3D object is commenced.

A LOD level "l" is in proportion to a distance "z" between the camera and the mesh. In other words, the LOD level "l" is determined in log scale according to the distance "z" as follows:

$$l = \log_2\left(\max\left(\frac{z^2}{z_0^2}, 1\right)\right)$$

$$z_0^2 = \frac{r^2}{q p_x p_y},$$

where $p_x$ and $p_y$ are camera projection coefficients and "r" is the radius of the 3D object.

Figure 19A:
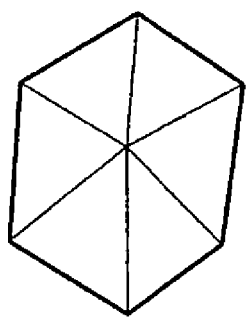
FIGS. 19A through 19C illustrates progressive transformation between LOD level "k−1" and LOD level "k"
Figure 19B:
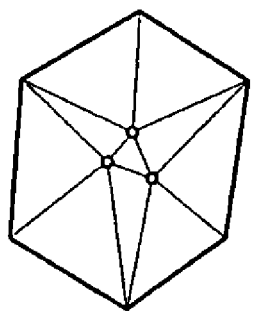
Figure 19C:
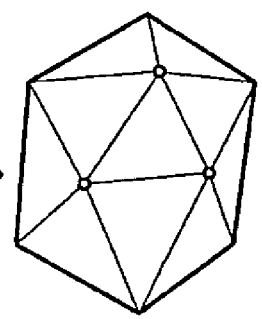

FIGS. 19A through 19C form a diagram for explaining geomorphing according to the present invention. When a LOD level changes, for example, when the number of triangles or the number of vertices is rapidly reduced in an original object, a popping effect visually unpleasant effect occurs. To prevent the popping effect, a stage (a) (FIG. 19A) having a level "k-1" does not directly progress to a stage (c) (FIG. 19C) having a level "k", but an intermediate stage (b) (FIG. 19B) is inserted. Since a collapsing vertex is calculated when a triangle in an object is collapsed during pre-processing according to an exemplary embodiment of the present invention, both of information regarding the triangle to be collapsed and information regarding the collapsing vertex created by the collapse of the triangle can be obtained. Accordingly, the intermediate stage (b) (FIG. 19B) can be easily implemented during rendering just by adjusting the values of both of the information.

Figures 20A, 20B, 20C:
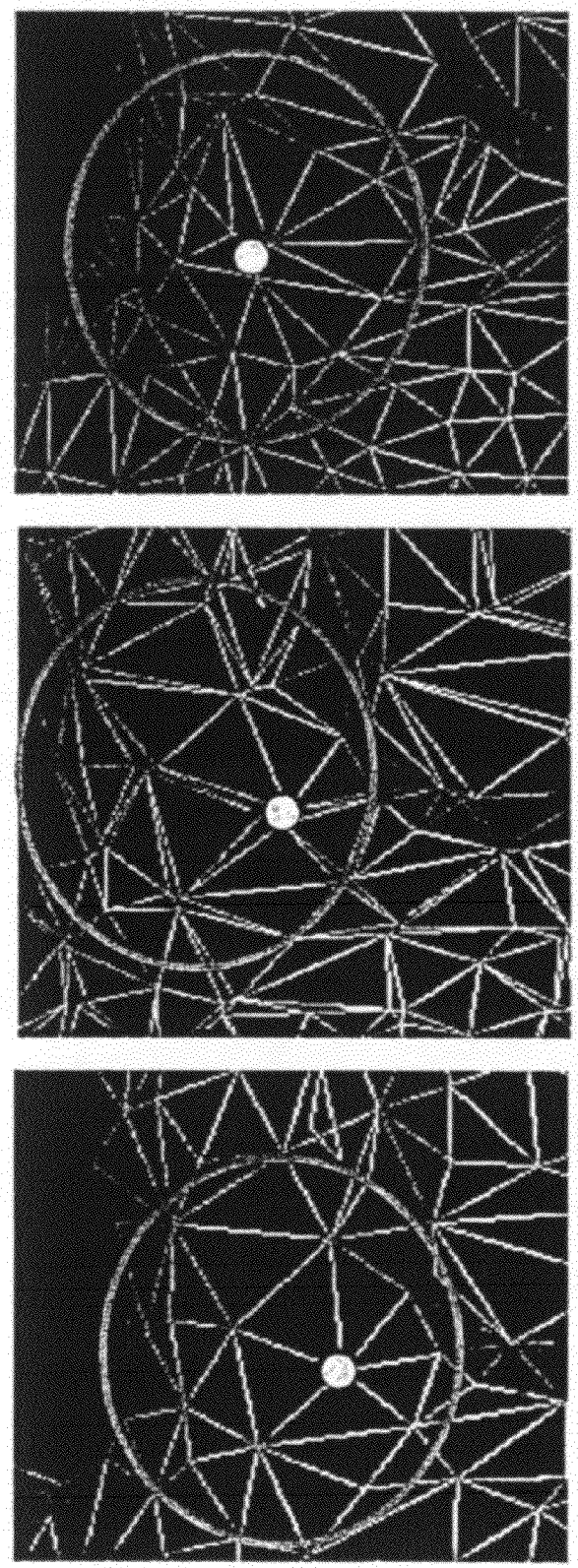
FIGS. 20A through 20C illustrates an example of geomorphing according to an exemplary embodiment of the present invention.

FIGS. 20A through 20C illustrate an example of geomorphing according to an exemplary embodiment of the present invention. When a stage (a) (FIG. 20A) progresses to a stage (c) (FIG. 20C) via an intermediate stage (b) (FIG. 20B), an object is more smoothly transformed than when the stage (a) (FIG. 20A) directly goes to the stage (c) (FIG. 20C).

VRML Node Syntax

As far as a VRML browser is used, an input mesh for a simplification algorithm is an IndexedFaceSet and outputs thereof are an improved IndexedFaceSetLOD and a simplification sequence. When the original IndexedFaceSet is improved, a new vertex is introduced. In other words, the collapse of a triangle leads to the creation of a new vertex. When the original IndexedFaceSet is optimized, elements in a coordIndex, a normalIndex, a colorIndex, and a texcoordIndex need to be re-arranged. Basic idea of the re-arrangement is positioning information on a face collapsed first at a last place.

FIG. 21 illustrates node syntax newly defined in accordance with a LOD method according to an exemplary embodiment of the present invention.

A lodSequence node has information regarding a triangle to be collapsed. A coordStart node has position information containing coordinate information of the triangle to be collapsed. A texcoordStart node has position information containing texture coordinate information of the triangle to be collapsed. A normalStart node has position information containing normal information of the triangle to be collapsed. A colorStart node has position information containing color information of the triangle to be collapsed.

Since coordinates must be present in attribute information of a triangle, the coordStart node positively exists. Otherwise, attributes such as, a texture coordinate value, a normal, and a color are optional, and thus the texcoordStart, the normalStart, and the colorStart are optional nodes. When more than one triangle are collapsed, coordinate information of a first collapsing vertex created by the collapse of a first triangle is obtained from the coordStart and coordinate information of a second collapsing vertex is obtained from "coordStart+1". This scheme is also applied with respect to the texcoordStart, the normalStart, and the colorStart. An updateDist node defines one or more stages inserted between two LOD levels for seamless rendering. A minScreenArea is a node that refers to a start point of LOD processing.

Meanwhile, among nodes included in a VRML model, a coord node, a texcoord node, a normal node, a color node, a coordIndex node, a texcoordIndex node, a normalIndex node, and a colorIndex node are re-arranged according to the present invention.

The coord node has original coordinate information of vertices of an object to be rendered according to the definition of the VRML model and also has coordinate information of a collapsing vertex created by collapsing a triangle at a position subsequent to the original coordinate information according to the present invention. The texcoord node has original texture coordinate information of the vertices of in the object to be rendered according to the definition of the VRML model and also has texture coordinate information of the collapsing vertex created by collapsing a triangle at a position subsequent to the original texture coordinate information according to the present invention. The normal node has original normal information of the vertices of the object to be rendered according to the definition of the VRML model and also has normal information of the collapsing vertex created by collapsing a triangle at a position subsequent to the original normal information according to the present invention. The color node has original color information of the vertices of the object to be rendered according to the definition of the VRML model. When the color of the collapsing vertex is obtained using the mean according to the present invention, color information of the collapsing vertex created by collapsing a triangle is positioned subsequent to the original color information. Alternatively, when the original color information of the vertices of the triangle to be collapsed is used for the color of the collapsing vertex without using the mean, only color information of the collapsed triangle is removed from the color node.

Elements in the coordIndex node, the texcoordIndex node, the normalIndex node, and the colorIndex node are re-arranged in order in which triangles are collapsed.

A simplification sequence is encoded into an MFInt32 lodSequence having a format shown in FIG. 22. A mesh at LOD=0 indicates the state of an original object before being transformed, i.e., simplified. Referring to FIG. 22, when a mesh at LOD=1 is generated, $n_1$ triangles are collapsed. In FIG. 22, "−1" between the mesh at LOD=1 and a mesh at LOD=2 is a separator. When the mesh at LOD=2 is generated, $n_2$ triangles are collapsed. When a mesh at LOD=N is generated, $n_N$ triangles are collapsed.

Although not described, herein a face removal is performed on the texcoordIndex node, the normalIndex node, and the colorIndex node in the same manner as on the coordIndex node.

Figure 23:
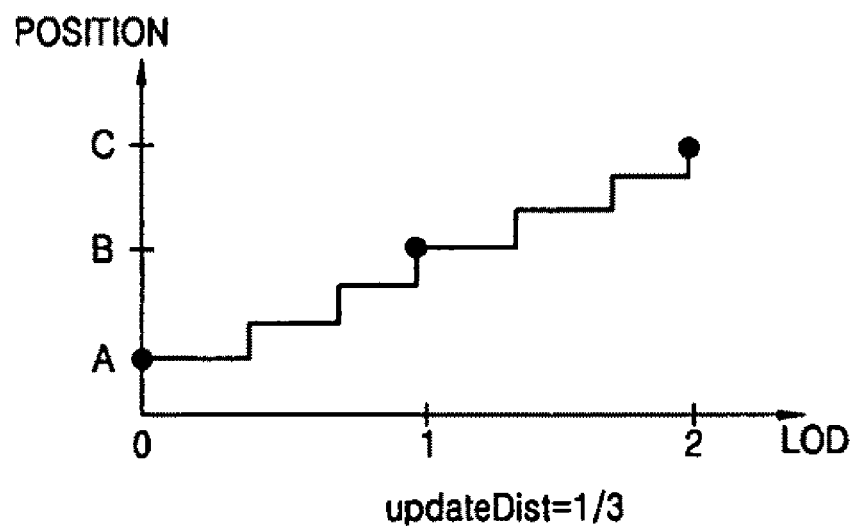
FIG. 23 is a diagram for explaining an updateDist shown in FIG. 21.

FIG. 23 is a diagram for explaining the updateDist shown in FIG. 21. The updateDist is a node for setting a subsidiary level to gradually transform an object between a LOD level and a subsequent LOD level.

Figure 24:
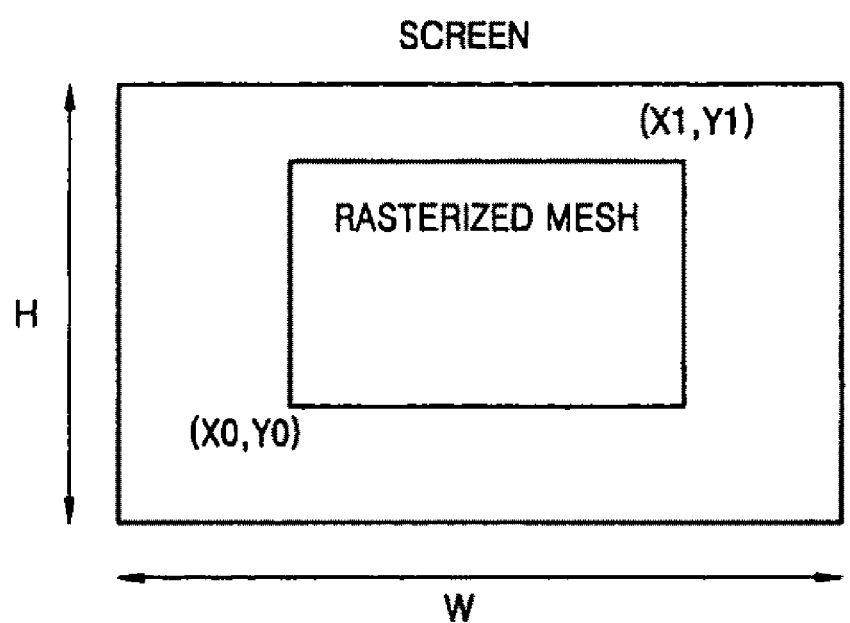
FIG. 24 is a diagram for explaining a minScreenArea shown in FIG. 21.

FIG. 24 is a diagram for explaining the minScreenArea shown in FIG. 21. As described above, the minScreenArea is determined by a proportion of a rendered mesh in an entire screen. The minScreenArea is a node defining a start point of LOD processing.

Figure 25:
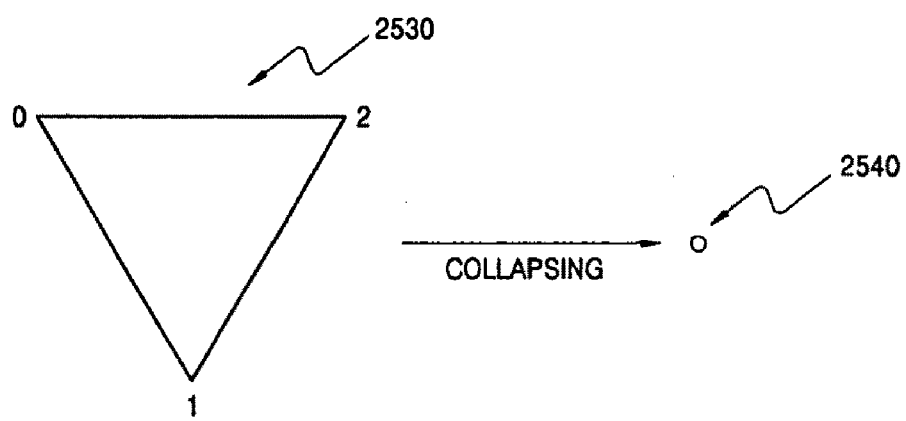
FIG. 25 is a diagram for explaining a procedure for transforming an original VRML model to a VRML model according to an exemplary embodiment of the present invention.
Figure 25:
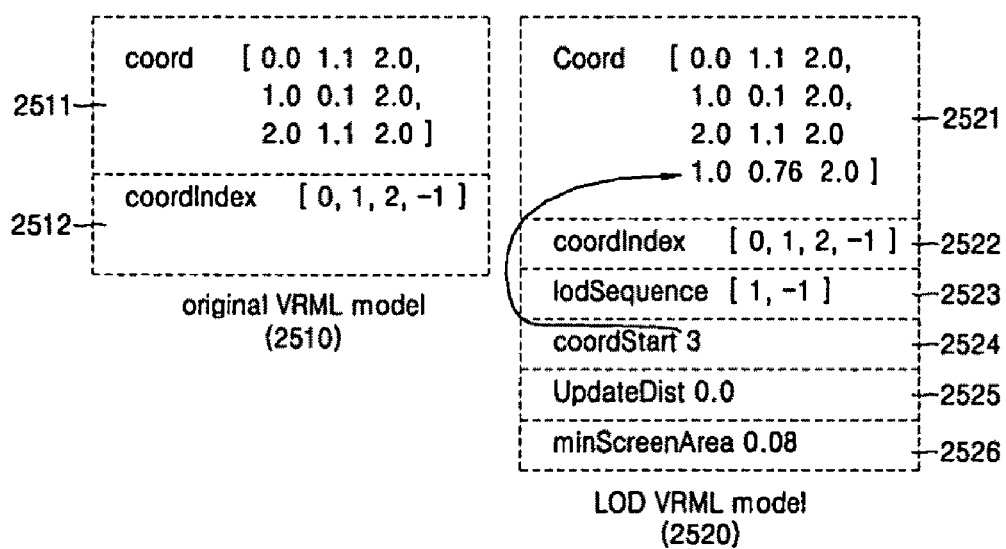

FIG. 25 is a diagram illustrating a procedure for transforming an original VRML model 2510 to a LOD VRML model 2520 according to an exemplary embodiment of the present invention in an exemplary case where a single triangle 2530 is collapsed and a single collapsing vertex 2540 is generated.

Referring to FIG. 25, the original VRML model 2510 includes information regarding vertices 0, 1, and 2 comprised in an object 2530, i.e., a coord node 2511, and information regarding a face of the object 2530, i.e., a coordIndex node 2512. The coord node 2511 has coordinate information regarding the vertices 0, 1, and 2, i.e., [0.0 1.1 2.0, 1.0 0.1 2.0, 2.0 1.1 2.0]. The coordIndex node 2512 has values of 0, 1, and 2 corresponding to the information regarding the face of the object 2530.

A pre-processing unit according to an exemplary embodiment of the present invention receives the original VRML model 2510, determines triangles to be collapsed, and calculates a collapsing vertex. Referring to FIG. 25, since there is only one triangle in the object 2530, the triangle is determined as the triangle to be collapsed and it is assumed that a coordinate value of the collapsing vertex is (1.0 0.76 2.0). In this situation, the coordinate value of the collapsing vertex, (1.0 0.76 2.0), is positioned at an end of a coord node 2521 in a LOD VRML model 2520 according to an exemplary embodiment of the present invention. It is supposed that triangles are re-arranged in a collapse order in a coordIndex node 2522 in the LOD VRML model 2520. However, in the exemplary embodiment illustrated in FIG. 25, there is only one triangle to be collapsed, and therefore, the coordIndex node 2522 is the same as the coordIndex node 2512 included in the original VRML model 2510. A lodSequence node 2523 has a value of "1" since there is only one triangle to be collapsed. A coordStart node 2524 has position information "3" indicating the position of the coordinate information of the collapsing vertex arranged in the coord node 2521. An updateDist node 2525 is set to "0" and a minScreenArea node 2526 is set to "0.08".

In the exemplary embodiment illustrated in FIG. 25, there is only one triangle to be collapsed. The following describes a case where there are two triangles to be collapsed.

Figures 26A, 26B:
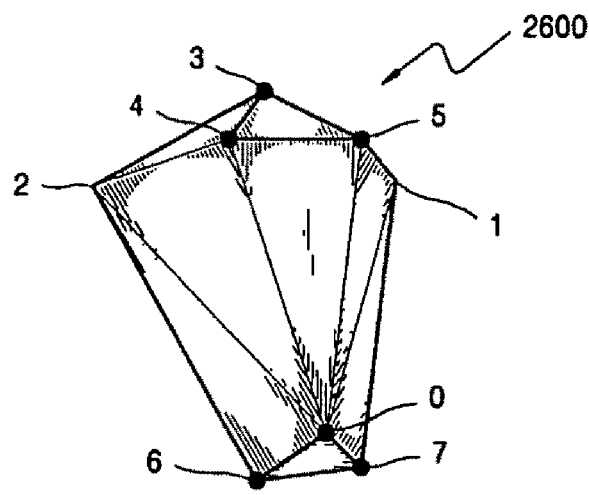
FIG. 26A illustrates an example of an object including at least two triangles.
FIG. 26B illustrates an original VRML model for the object shown in FIG. 26A.

FIG. 26A illustrates an object 2600 to be rendered. The object 2600 has 8 vertices 0 through 7.

FIG. 26B illustrates an original VRML model 2610 for the object 2600 shown in FIG. 26A. With respect to the object 2600, only coordinate information is shown in FIG. 26B, but other attribute information such as texture and color may be present. Referring to FIG. 26B, coordinate information of the respective vertices 0 through 7 comprised in the object 2600 to be rendered is arranged in a coord 2611. Coordinate information of the vertex 0 is expressed as "x0, y0, z0" and coordinate information of the vertex 1 is expresses as "x1, y1, z1". Coordinate information of the other vertices is expressed in the same manner. Information regarding faces, i.e., triangles constituting the object 2600 to be rendered, is arranged in coordIndex 2612.

Figure 26C:
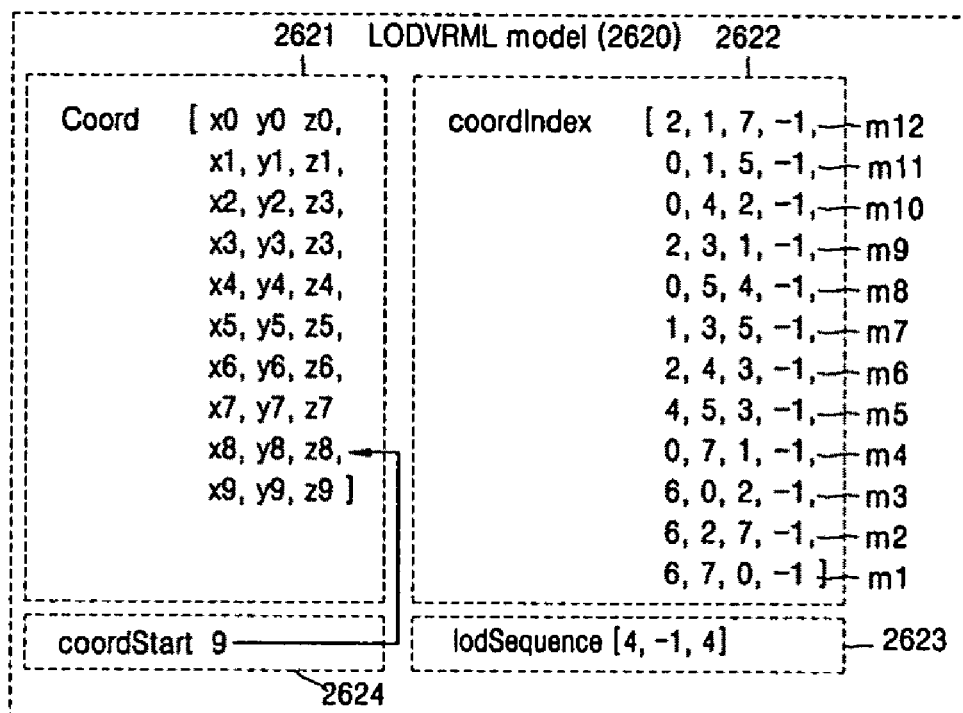
FIG. 26C illustrates a LOD VRML model used to render the object shown in FIG. 26A according to an exemplary embodiment of the present invention.

A pre-processing unit receiving the original VRML model 2610 according to an exemplary embodiment of the present invention calculates error values for the respective triangles using the information regarding the vertices 0 through 7 contained in the coord 2611 and the information regarding the faces contained in the coordIndex 2612 and re-arranges the triangles in the coordIndex 2612 according to the error values, thereby determining a triangle collapse sequence. FIG. 26C illustrates a LOD VRML model 2620 created by the pre-processing unit.

Let's assume that the triangles respectively defined by two sets of vertices (6, 7, 0) and (3, 4, 5) are determined as the triangles to be collapsed. Then, in the LOD VRML model 2620, information regarding faces is arranged in a triangle collapse sequence in coordIndex 2622. Referring to FIG. 26C, information m1 regarding a triangle to be collapsed first is positioned at an end of the coordIndex 2622. Referring back to FIG. 26A, when the triangle defined by the set of vertices (6, 7, 0) is collapsed, the triangles sharing two vertices with the collapsed triangle are also collapsed. That is, the triangles respectively defined by sets of vertices (6, 2, 7), (6, 0, 2), and (0, 7, 1) are collapsed together with the triangle determined to be collapsed first. Here, information m2, m3 and m4 regarding the triangles to be collapsed together with the triangle determined to be collapsed first are arranged before the information m1 in the coordIndex 2622.

Since the triangle defined by the set of vertices (3, 4, 5) is determined to be collapsed second, information m5 regarding the triangle to be collapsed second is arranged before the information m4. Referring back to FIG. 26A, when the triangle defined by the set of vertices (3, 4, 5) is collapsed, the triangles sharing two vertices with the collapsed triangle are also collapsed. That is, the triangles respectively defined by sets of vertices (2, 4, 3), (1, 3, 5), and (0, 5, 4) are collapsed together with the triangle determined to be collapsed second. Here, information m6, m7 and m8 regarding the triangles to be collapsed together with the triangle determined to be collapsed second are arranged before the information m5 in the coordIndex 2622. Descriptions of the other triangles will be omitted.

The number of triangles to be collapsed according to the triangle collapse sequence is contained in lodSequence 2623. As described above, the lodSequence 2623 shown in FIG. 26C indicates that four triangles connected with the set of vertices (6, 7, 0) are collapsed when a transition from LOD level 0 to LOD level 1 is made and four triangles connected with the set of vertices (3, 4, 5) are collapsed when a transition from LOD level 1 to LOD level 2 is made. A value of "−1" in the lodSequence 2623 serves to separate two LOD levels.

After determining the triangles to be collapsed in the object 2600 to be rendered, the pre-processing unit of the present invention calculates a collapsing vertex created by the collapse of the triangles. Information on the calculated collapsing vertex is positioned at an end of a coord 2621 in the LOD VRML model 2620. Since the two triangles are determined to be collapsed in the exemplary embodiment of the present invention, two collapsing vertices are created and have coordinate values (x8, y8, z8) and (x9, y9, z9), respectively.

Information on a position of the coordinate information of a collapsing vertex is contained in coordStart 2624 included in the LOD VRML model 2620. Referring to FIG. 26C, the coordStart 2624 contains a value of "9". Accordingly, a rendering unit obtains the coordinate information of a first collapsing vertex from a ninth place in the coord 262. The rendering unit can obtain the coordinate information of a second collapsing vertex from a place in the coord 2621, which is obtained by increasing the value of the coordStart 2624 by 1.

In addition to the above described exemplary embodiments, exemplary embodiments of the present invention can also be implemented by executing computer readable code/instructions in/on a medium, e.g., a computer readable medium. The medium can correspond to any medium/media permitting the storing and/or transmission of the computer readable code.

The computer readable code/instructions can be recorded/transferred on a medium in a variety of ways, with examples of the medium including magnetic storage media (e.g., ROM, floppy disks, hard disks, etc.), random access memories, optical recording media (e.g., CD-ROMs, or DVDs), and storage/transmission media such as carrier waves, as well as through the Internet, for example. The medium may also be a distributed network, so that the computer readable code/instructions is stored/transferred and executed in a distributed fashion. The computer readable code/instructions may be executed by one or more processors.

As described above, according to the present invention, rendering of a 3D object can be effectively performed in a system having limited resources. The present invention can be used for an embedded system that effectively renders and loads 3D data in a terminal apparatus such as a 3D telematics system for effectively rendering a large amount of 3D geometric data, a low-performance personal digital assistant (PDP), or a phone.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A method of transforming a graphic data of an object comprising at least one triangle, the method comprising:
   using a computer to perform:
   determining at least one triangle to be collapsed among the at least one triangle comprised in the object;
   determining a collapsing vertex to be created by collapsing the at least one triangle; and
   transforming the graphic data of the object based on information regarding the at least one triangle determined to be collapsed and information regarding the determined collapsing vertex,
   wherein the determining of the at least one triangle to be collapsed is based on geometric characteristics of plural triangles including a ratio of an area of the at least one triangle to be collapsed to an area of a largest triangle in the object and a degree of variation of attribute characteristics of at least one shared vertex between the at least one triangle to be collapsed and at least one of plural triangles neighboring the at least one triangle to be collapsed.

2. The method of claim 1, wherein the determining of the at least one triangle to be collapsed comprises:
   determining parameter that has the least influence on object rendering when a triangle comprised in the object is removed; and
   determining the at least one triangle to be collapsed based on the parameter.

3. The method of claim 1, wherein the determining of the collapsing vertex comprises calculating the collapsing vertex based on three vertices of the at least one triangle to be collapsed and a tangent plane of the three vertices.

4. The method of claim 1, wherein the determining of the collapsing vertex comprises calculating attribute information of the collapsing vertex based on three vertices of the at least one triangle to be collapsed.

5. The method of claim 4, wherein the calculating of the attribute information of the collapsing vertex comprises using a mean of three vertices of the triangle to be collapsed or reflecting characteristics of the three vertices.

6. The method of claim 1, wherein the geometric characteristics of the plural triangles further comprises a radius of curvature of the at least one triangle to be collapsed.

7. A method of adaptively transforming a graphic data of an object, the method comprising:
   using a computer to perform:
   receiving a graphic model including information regarding vertices of the object and information regarding at least one triangle comprised in the object to express the object comprising one or more triangles;
   determining at least one triangle to be collapsed among the triangles comprised in the object and determining a collapsing vertex to be created by collapsing the at least one triangle;
   creating a graphic model including information regarding the at least one triangle determined to be collapsed and information regarding the determined collapsing vertex;
   transforming the graphic data of the object based on the created graphic model; and rendering the object,
   wherein the determining of the at least one triangle to be collapsed is based on geometric characteristics of plural triangles including a ratio of an area of the at least one triangle to be collapsed to an area of a largest triangle in the object and a degree of variation of attribute characteristics of at least one shared vertex between the at least one triangle to be collapsed and at least one of plural triangles neighboring the at least one triangle to be collapsed.

8. The method of claim 7, wherein the determining of the at least one triangle and the collapsing vertex comprises:
   defining an error metric serving as an indicator indicating a degree of influence that each triangle comprised in the object has on object rendering;
   calculating error values with respect to each triangle comprised in the object based on the error metric; and
   determining the at least one triangle to be collapsed and a triangle collapse sequence based on the calculated error values.

9. A method of adaptively transforming a graphic data of an object comprising one or more triangles, the method comprising:

using a computer to perform:
defining an error metric serving as an indicator that indicates a degree of influence that each triangle comprised in the object has on object rendering;
calculating error values with respect to each triangle comprised in the object based on the error metric; and
collapsing first a triangle having a least error value among the calculated error values,
wherein the defining of the error metric comprises defining the error metric respectively for each triangle in an object as a sum of an error regarding geometric characteristics for plural triangles including a ratio of an area of the each triangle in the object to an area of a largest triangle in the object and an error regarding a degree of variation of attribute characteristics of at least one shared vertex between the at least one triangle to be collapsed and at least one of plural triangles neighboring the at least one triangle to be collapsed.

10. The method of claim 9, wherein the error regarding geometric characteristics of each triangle is determined based on at least one of a radius of curvature of the triangle, an area of the triangle in an entire mesh, and whether the triangle is located at a border.

11. The method of claim 9, wherein the error regarding attribute characteristics of the plural triangles is determined based on at least one of a variation of color between the triangle and neighboring triangles, a variation of a texture coordinate value therebetween, and a variation of a normal line therebetween.

12. The method of claim 9, wherein the collapsing of the triangle comprises:

creating a collapsing vertex to replace the triangle;
changing a connection relationship between the triangles comprised in the object based on the collapsing vertex; and
creating a new graphic data of the object based on the changed connection relationship.

13. A method of creating a graphic model used to adaptively transform a graphic data of an object comprising a plurality of triangles, the method comprising:

using a computer to perform:
determining triangles to be collapsed in the object, a triangle collapse sequence, and a collapsing vertex to be created by collapsing the triangles;
generating a triangle identifier node in which information regarding the triangles comprised in the object are arranged in the triangle collapse sequence;
generating a level of detail (LOD) sequence node including triangle collapse sequence information;
generating a coordinate node in which coordinate information of vertices of the object and coordinate information of the collapsing vertex are arranged; and
generating a collapsing vertex position node that refers to a position of the coordinate information of the collapsing vertex located in the coordinate node,
wherein the determining of the triangles to be collapsed is based on geometric characteristics of plural triangles including a ratio of an area of each of the triangles to be collapsed to an area of a largest triangle in the object and a degree of variation of attribute characteristics of at least one shared vertex between the at least one triangle to be collapsed and at least one of plural triangles neighboring the triangles to be collapsed.

14. The method of claim 13, wherein the determining comprises:

calculating error values with respect to each of the triangles comprised in the object based on an error metric corresponding to parameter that indicates a degree of influence that each triangle comprised in the object has on object rendering; and
determining the triangle collapse sequence so that a triangle having a smaller error value is collapsed earlier.

15. The method of claim 13, further comprising:

generating an update node including information for collapsing the triangles gradually between collapsing levels; and
generating a node including information regarding a level where the collapse of the triangles is started in the object.

16. The method of claim 13, further comprising at least one of:

generating a color node in which color information of the vertices of the object and color information of the collapsing vertex are arranged and generating a collapsing vertex color node that refers to a position of the color information of the collapsing vertex arranged in the color node;
generating a normal node in which normal information of the vertices comprised in the object and normal information of the collapsing vertex are arranged and generating a collapsing vertex normal node that refers to a position of the normal line information of the collapsing vertex arranged in the normal node; and
generating a texture coordinate node in which texture coordinate information of the vertices of the object and texture coordinate information of the collapsing vertex are arranged and generating a collapsing vertex texture coordinate node that refers to a position of the texture coordinate information of the collapsing vertex arranged in the texture coordinate node.

17. The method of claim 13, further comprising at least one of:

generating a color node in which color information of vertices forming the object except for color information regarding collapsed triangles is arranged;
generating a normal node, in which normal information of the vertices comprised in the object and normal information of the collapsing vertex are arranged, and a collapsing vertex normal node that refers to a position of the normal information of the collapsing vertex arranged in the normal node; and
generating a texture coordinate node, in which texture coordinate information of the vertices comprised in the object and texture coordinate information of the collapsing vertex are arranged, and a collapsing vertex texture coordinate node that refers to a position of the texture coordinate information of the collapsing vertex arranged in the texture coordinate node.

18. A method of creating a virtual reality modeling language (VRML) model used to adaptively transforming a graphic data of an object comprising a plurality of triangles, the method comprising:

using a computer to perform:
determining triangles to be collapsed in the object, a triangle collapse sequence, and a collapsing vertex to be created by collapse of the triangles;
generating a coordIndex node in which information regarding the triangles comprised in the object are arranged in the triangle collapse sequence;
generating a lodSequence node including triangle collapse sequence information;

generating a coord node in which coordinate information of vertices of the object and coordinate information of the collapsing vertex are arranged; and generating a coordStart node that refers to a position of the coordinate information of the collapsing vertex arranged in the coord node, wherein the determining of the triangles to be collapsed is based on geometric characteristics of plural triangles including a ratio of an area of each of the triangles to be collapsed to an area of a largest triangle in the object and a degree of variation of attribute characteristics of at least one shared vertex between the at least one triangle to be collapsed and at least one of plural triangles neighboring the triangles to be collapsed.

19. The method of claim 18, further comprising at least one of:

generating a normalIndex node in which information regarding each of the triangles comprised in the object are arranged in the collapsing triangle sequence, generating a normal node in which normal line information of the vertices comprised in the object and normal information of the collapsing vertex are arranged, and generating a normalStart node that refers to a position of the normal line information of the collapsing vertex arranged in the normal node;

generating a colorIndex node in which information each of regarding the triangles comprised in the object are arranged in the collapsing triangle sequence, generating a color node in which color information of the vertices of the object and color information of the collapsing vertex are arranged, and generating a colorStart node that refers to a position of the color information of the collapsing vertex arranged in the color node; and generating a texcoordIndex node in which information regarding each of the triangles comprised in the object are arranged in the collapsing triangle sequence, a texture coordinate node in which texture coordinate information of the vertices of the object and the texture coordinate information of the collapsing vertex are arranged, and generating a texcoordStart node that refers to a position of the texture coordinate information of the collapsing vertex arranged in the texture coordinate node.

20. The method of claim 18, further comprising at least one of:

generating a normalIndex node in which information regarding each of the triangles comprised in the object are arranged in the collapsing triangle sequence, generating a normal node in which normal line information of the vertices comprised in the object and normal information of the collapsing vertex are arranged, and generating a normalStart node that refers to a position of the normal line information of the collapsing vertex arranged in the normal node;

generating a colorIndex node in which information each of regarding the triangles comprised in the object are arranged in the collapsing triangle sequence and generating a color node in which color information of the vertices of the object except for color information of collapsed triangles is arranged; and generating a texcoordIndex node in which information regarding each of the triangles comprised in the object are arranged in the collapsing triangle sequence, generating a texture coordinate node in which texture coordinate information of the vertices of the object and the texture coordinate information of the collapsing vertex are arranged, and generating a texcoordStart node that refers to a position of the texture coordinate information of the collapsing vertex arranged in the texture coordinate node.

21. An apparatus for transforming a graphic data of an object comprising one or more triangles, the apparatus comprising:

a pre-processing unit, including at least one processing device for determining at least one triangle to be collapsed among the triangles comprised in the object and determining a collapsing vertex to be created by collapsing the at least one triangle; and a rendering unit transforming the graphic data of the object based on information regarding the of least one triangle determined by the pre-processing unit to be collapsed and information regarding the determined collapsing vertex and performing object rendering, wherein the pre-processing unit determines the at least one triangle to be collapsed based on geometric characteristics of plural triangles including a ratio of an area of the at least one triangle to be collapsed to an area of a largest triangle in the object and a degree of variation of attribute characteristics of at least one shared vertex between the at least one triangle to be collapsed and at least one of plural triangles neighboring the at least one triangle to be collapsed.

22. The apparatus of claim 21, wherein the pre-processing unit determines parameter that has the least influence on object rendering when a triangle comprised in the object is removed and determines the at least one triangle to be collapsed based on the parameter.

23. The apparatus of claim 21, wherein the pre-processing unit calculates the collapsing vertex based on three vertices of the at least one triangle to be collapsed and a tangent plane of the three vertices.

24. An apparatus for adaptively transforming a graphic data of an object, the apparatus comprising:

a pre-processing unit, including at least one processing device for receiving a graphic model including information regarding vertices comprising the object and information regarding at least one triangle comprised in the object to express the object comprising the at least one triangle, determining the at least one triangle to be collapsed among the triangles comprised in the object, determining a collapsing vertex to be created by collapsing the at least one triangle, and creating a graphic model including information regarding the at least one triangle determined to be collapsed and information regarding the determined collapsing vertex; and a rendering unit transforming the graphic data of the object based on the created graphic model and rendering the object, wherein the pre-processing unit determines the at least one triangle to be collapsed based on geometric characteristics of plural triangles including a ratio of an area of the at least one triangle to be collapsed to an area of a largest triangle in the object and a degree of variation of attribute characteristics of at least one shared vertex between the at least one triangle to be collapsed and at least one of plural triangles neighboring the at least one triangle to be collapsed.

25. The apparatus of claim 24, wherein the pre-processing unit defines an error metric serving as parameter indicating a degree of influence that each triangle comprised in the object has on object rendering, calculates error values with respect to each triangle comprised in the object based on the error metric, and determines the at least one triangle to be collapsed and a triangle collapse sequence based on the calculated error values.

26. An apparatus for adaptively transforming a graphic data of an object comprising one or more triangles, the apparatus comprising:
  a pre-processing unit, including at least one processing device, defining an error metric serving as an indicator indicating a degree of influence that each triangle comprised in the object has on object rendering and calculating error values with respect to each of the triangles comprised in the object based on the error metric; and
  a rendering unit collapsing first a triangle having a least error value among the calculated error values and rendering the object,
  wherein the pre-processing unit defines the error metric respectively for each triangle in an object as a sum of an error regarding geometric characteristics for plural triangles including a ratio of an area of the each triangle in the object to an area of a largest triangle in the object and an error regarding a degree of variation of attribute characteristics of at least one shared vertex between at least one of the plural triangles.

27. The apparatus of claim 26, wherein the error regarding geometric characteristics of each triangle is determined based on at least one of a radius of curvature of the triangle, an area of the triangle in an entire mesh, and whether the triangle is located at a border.

28. The apparatus of claim 26, wherein error regarding attribute characteristics of the triangle is determined based on at least one of a variation of color between the triangle and neighboring triangles, a variation of a texture coordinate value therebetween, and a variation of a normal line therebetween.

29. The apparatus of claim 26, wherein the pre-processing unit creates a collapsing vertex to replace the triangle and changes a connection relationship between the triangles comprised in the object based on the collapsing vertex, and the rendering unit creates a new graphic data of the object based on the changed connection relationship.

30. An apparatus for creating a graphic model used to adaptively transforming a graphic data of an object comprising one or more triangles, the apparatus comprising:
  an error value calculator determining triangles to be collapsed in the object and a triangle collapse sequence based on a degree of influence that each triangle comprised in the object has on object rendering;
  a collapsing vertex calculator determining a collapsing vertex to be created by collapsing the triangles; and
  a graphic model creator, including at least one processing device, generating a triangle identifier node in which information regarding the triangles comprised in the object are arranged in the triangle collapse sequence, a level of detail (LOD) sequence node including triangle collapse sequence information, a coordinate node in which coordinate information of vertices comprised in the object and coordinate information of the collapsing vertex are arranged, and a collapsing vertex position node that refers to a position of the coordinate information of the collapsing vertex located in the coordinate node,
  wherein the error value calculator determines the triangles to be collapsed based on geometric characteristics of plural triangles including a ratio of an area of each of the triangles to be collapsed to an area of a largest triangle in the object and a degree of variation of attribute characteristics of at least one shared vertex between the at least one triangle to be collapsed and at least one of plural triangles neighboring the triangles to be collapsed.

31. The apparatus of claim 30, wherein the error value calculator calculates error values with respect to each of the triangles comprised in the object based on an error metric corresponding to parameter that indicates a degree of influence that each triangle comprised in the object has on object rendering and determines the triangle collapse sequence so that a triangle having a smaller error value is collapsed earlier.

32. The apparatus of claim 30, wherein the graphic model creator further generates an update node including information for collapsing the triangles gradually between collapsing levels at and generates a node including information regarding a level where the collapse of the triangles is started in the object.

33. The apparatus of claim 30, wherein the graphic model creator further generates at least one of:
  a color node, in which color information of the vertices comprised in the object and color information of the collapsing vertex are arranged, and a collapsing vertex color node that refers to a position of the color information of the collapsing vertex arranged in the color node;
  a normal node, in which normal information of the vertices comprised in the object and normal line information of the collapsing vertex are arranged, and a collapsing vertex normal node that refers to a position of the normal line information of the collapsing vertex arranged in the normal node; and
  a texture coordinate node, in which texture coordinate information of the vertices comprised in the object and texture coordinate information of the collapsing vertex are arranged, and a collapsing vertex texture coordinate node that refers to a position of the texture coordinate information of the collapsing vertex arranged in the texture coordinate node.

34. The apparatus of claim 30, wherein the graphic model creator further generates at least one of:
  a color node in which color information of vertices forming the object except for color information regarding collapsed triangles is arranged;
  a normal node, in which normal information of the vertices comprised in the object and normal information of the collapsing vertex are arranged, and a collapsing vertex normal node that refers to a position of the normal information of the collapsing vertex arranged in the normal node; and
  a texture coordinate node, in which texture coordinate information of the vertices comprised in the object and texture coordinate information of the collapsing vertex are arranged, and a collapsing vertex texture coordinate node that refers to a position of the texture coordinate information of the collapsing vertex arranged in the texture coordinate node.

35. An apparatus for creating a virtual reality modeling language (VRML) model used to adaptively transforming a graphic data of an object comprising a plurality of triangles, the apparatus comprising:
  an error value calculator, including at least one processing device, determining triangles to be collapsed in the object and a triangle collapse sequence based on a degree of influence that each triangle comprised in the object has object rendering;
  a collapsing vertex calculator determining a collapsing vertex to be created by collapsing of the triangles; and
  a graphic model creator generates a coordIndex node, in which information regarding the triangles comprised in the object are arranged in the triangle collapse sequence, a lodSequence node including triangle collapse sequence information, a coord node, in which coordinate information of vertices comprised in the object and coordinate information of the collapsing vertex are arranged, and a coordStart node that refers to a position of the coordinate information of the collapsing vertex arranged in the coord node, wherein the error value calculator determines the triangles to be collapsed based on geometric characteristics of plural triangles including a ratio of an area of each of the triangles to be collapsed to an area of a largest triangle in the object and a degree of variation of attribute characteristics of at least one shared vertex between the at least one triangle to be collapsed and at least one of plural triangles neighboring the triangles to be collapsed.

36. The apparatus of claim 35, wherein the graphic model creator further generates at least one of:

a normalIndex node in which information regarding each of the triangles comprised in the object are arranged in the collapsing triangle sequence, a normal node in which normal information of the vertices comprised in the object and normal information of the collapsing vertex are arranged, and a normalStart node that refers to a position of the normal line information of the collapsing vertex arranged in the normal node;

a colorIndex node in which information regarding each of the triangles comprised in the object are arranged in the collapsing triangle sequence, a color node in which color information of the vertices comprised in the object and color information of the collapsing vertex are arranged, and a colorStart node that refers to a position of the color information of the collapsing vertex arranged in the color node; and a texcoordIndex node in which information regarding the respective triangles comprised in the object are arranged in the collapsing triangle sequence, a texture coordinate node in which texture coordinate information of the vertices comprised in the object and the texture coordinate information of the collapsing vertex are arranged, and a texcoordStart node that refers to a position of the texture coordinate information of the collapsing vertex arranged in the texture coordinate node.

37. The apparatus of claim 35, wherein the graphic model creator further generates at least one of:

a normalIndex node in which information regarding each of the triangles comprised in the object are arranged in the collapsing triangle sequence, a normal node in which normal line information of the vertices comprised in the object and normal information of the collapsing vertex are arranged, and a normalStart node that refers to a position of the normal line information of the collapsing vertex arranged in the normal node;

a colorIndex node in which information each of regarding the triangles comprised in the object are arranged in the collapsing triangle sequence and a color node in which color information of the vertices of the object except for color information of collapsed triangles is arranged; and a texcoordIndex node in which information regarding each of the triangles comprised in the object are arranged in the collapsing triangle sequence, a texture coordinate node in which texture coordinate information of the vertices of the object and the texture coordinate information of the collapsing vertex are arranged, and a texcoordStart node that refers to a position of the texture coordinate information of the collapsing vertex arranged in the texture coordinate node.

38. At least one non-transitory tangible computer readable medium storing instructions that control at least one processor for executing a method of transforming a graphic data of an object comprised of at least one triangle, the method comprising:

determining at least one triangle to be collapsed among the at least one triangle comprised in the object;

determining a collapsing vertex to be created by collapse of the at least one triangle; and transforming the graphic data of the object based on information regarding the at least one triangle determined to be collapsed and information regarding the determined collapsing vertex, wherein the determining of the at least one triangle to be collapsed is based on geometric characteristics of plural triangles including a ratio of an area of the at least one triangle to be collapsed to an area of a largest triangle in the object and a degree of variation of attribute characteristics of at least one shared vertex between the at least one triangle to be collapsed and at least one of plural triangles neighboring the at least one triangle to be collapsed.

39. At least one non-transitory tangible computer readable medium storing instructions that control at least one processor for executing a method of adaptively transforming a graphic data of an object, the method comprising:

receiving a graphic model that includes information regarding vertices comprised in the object and information regarding at least one triangle comprised in the object to express the object comprised of the at least one triangle;

determining at least one triangle to be collapsed among the triangles comprised in the object and determining a collapsing vertex to be created by collapse of the at least one triangle;

creating a graphic model including information regarding the at least one triangle determined to be collapsed and information regarding the determined collapsing vertex;

transforming the graphic data of the object based on the created graphic model; and rendering the object, wherein the determining of the at least one triangle to be collapsed is based on geometric characteristics of plural triangles including a ratio of an area of the at least one triangle to be collapsed to an area of a largest triangle in the object and a degree of variation of attribute characteristics of at least one shared vertex between the at least one triangle to be collapsed and at least one of plural triangles neighboring the at least one triangle to be collapsed.

40. At least one non-transitory tangible computer readable medium storing instructions that control at least one processor for executing a method of adaptively transforming a graphic data of an object comprised of at least one triangle, the method comprising:

defining an error metric serving as an indicator that indicates a degree of influence that each triangle comprised in the object exerts on an expression of the object;

calculating error values with respect to respective triangles comprised in the object based on the error metric; and collapsing first a triangle having a least error value among the calculated error values, wherein the defining of the error metric comprises defining the error metric respectively for each triangle in an object as a sum of an error regarding geometric characteristics including a ratio of an area of the each triangle in the object to an area of a largest triangle in the object for the respective triangles and an error regarding a degree of variation of attribute characteristics of at least one shared vertex between the triangle having a least error value and at least one of the respective triangles neighboring the triangle having a least error value.

41. At least one non-transitory tangible computer readable medium storing instructions that control at least one processor for executing a method of creating a graphic model used to adaptively transforming a graphic data of an object comprised of a plurality of triangles, the method comprising:
   determining triangles to be collapsed in the object, a triangle collapse sequence, and a collapsing vertex to be created by collapse of the triangles;
   generating a triangle identifier node in which information regarding the triangles comprised in the object are arranged in the triangle collapse sequence;
   generating a level of detail (LOD) sequence node including triangle collapse sequence information;
   generating a coordinate node in which coordinate information of vertices comprised in the object and coordinate information of the collapsing vertex are arranged; and
   generating a collapsing vertex position node that refers to a position of the coordinate information of the collapsing vertex located in the coordinate node,
   wherein the determining of the triangles to be collapsed is based on geometric characteristics of plural triangles including a ratio of an area of each of the triangles to be collapsed to an area of a largest triangle in the object and a degree of variation of attribute characteristics of at least one shared vertex between the at least one triangle to be collapsed and at least one of plural triangles neighboring the triangles to be collapsed.

42. At least one non-transitory tangible computer readable medium storing instructions that control at least one processor for executing a method of creating a virtual reality modeling language (VRML) model used to adaptively transforming a graphic data of an object comprised of a plurality of triangles, the method comprising:
   determining triangles to be collapsed in the object, a triangle collapse sequence, and a collapsing vertex to be created by collapse of the triangles;
   generating a coordIndex node in which information regarding the triangles comprised in the object are arranged in the triangle collapse sequence;
   generating a lodSequence node including triangle collapse sequence information;
   generating a coord node in which coordinate information of vertices comprised in the object and coordinate information of the collapsing vertex are arranged; and
   generating a coordStart node that refers to a position of the coordinate information of the collapsing vertex arranged in the coord node,
   wherein the determining of the triangles to be collapsed is based on geometric characteristics of plural triangles including a ratio of an area of each of the triangles to be collapsed to an area of a largest triangle in the object and a degree of variation of attribute characteristics of at least one shared vertex between the at least one triangle to be collapsed and at least one of plural triangles neighboring the triangles to be collapsed.

43. A method of transforming a graphic data of an object comprising a plurality of triangles, the method comprising:
   using a computer to perform:
   determining at least one triangle to be collapsed among the plurality of triangles;
   determining a collapsing vertex to be created by collapsing the at least one triangle; and
   transforming the graphic data of the object based on the at least one triangle determined to be collapsed and the collapsing vertex,
   wherein the determining of the at least one triangle to be collapsed is based on geometric characteristics of plural triangles including a ratio of an area of the at least one triangle to be collapsed to an area of a largest triangle in the object and a degree of variation of attribute characteristics of at least one shared vertex between the at least one triangle to be collapsed and at least one of plural triangles neighboring the at least one triangle to be collapsed.

44. At least one non-transitory tangible computer readable medium storing instructions that control at least one processor for executing a method of transforming a graphic data of an object comprised of a plurality of triangles, the method comprising:
   determining at least one triangle to be collapsed among the plurality of triangles;
   determining a collapsing vertex to be created by collapsing the at least one triangle; and
   transforming the graphic data of the object based on the at least one triangle determined to be collapsed and the collapsing vertex,
   wherein the determining of the at least one triangle to be collapsed is based on geometric characteristics of plural triangles including a ratio of an area of the at least one triangle to be collapsed to an area of a largest triangle in the object and a degree of variation of attribute characteristics of at least one shared vertex between the at least one triangle to be collapsed and at least one of plural triangles neighboring the at least one triangle to be collapsed.

* * * * *

UNITED STATES PATENT AND TRADEMARK OFFICE
CERTIFICATE OF CORRECTION

PATENT NO. : 8,259,113 B2  
APPLICATION NO. : 12/805274  
DATED : September 4, 2012  
INVENTOR(S) : Jeonghwan Ahn et al.

Page 1 of 1

It is certified that error appears in the above-identified patent and that said Letters Patent is hereby corrected as shown below:

In the Claims:

Column 25, Line 11 (Approx.), In Claim 9, delete "first a" and insert -- a first --, therefor.
Column 28, Line 14 (Approx.), In Claim 21, delete "the of least one" and insert -- the at least one --, therefor.
Column 32, Line 60, In Claim 40, delete "first a" and insert -- a first --, therefor.

Signed and Sealed this
Tenth Day of September, 2013

Teresa Stanek Rea
*Acting Director of the United States Patent and Trademark Office*